(12) United States Patent
Karl et al.

(10) Patent No.: US 10,996,825 B2
(45) Date of Patent: May 4, 2021

(54) SMARTBOOK SYSTEM HAVING A SYNERGISTIC PAGE, SPINE, EDGE EXTENSION AND POWER DESIGN

(71) Applicant: Intel Corporation, Santa Clara, CA (US)

(72) Inventors: Christian Karl, Hudson, MA (US); Charles Magnuson, Sutton, MA (US); Sergei Babokhov, Acton, MA (US); Timothy D. Wig, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 1004 days.

(21) Appl. No.: 15/186,597

(22) Filed: Jun. 20, 2016

(65) Prior Publication Data

US 2017/0364220 A1     Dec. 21, 2017

(51) Int. Cl.
| | |
|---|---|
| G06F 3/0483 | (2013.01) |
| G06F 1/16 | (2006.01) |
| G06F 3/01 | (2006.01) |
| H04N 5/247 | (2006.01) |
| G06F 3/147 | (2006.01) |
| G06F 3/14 | (2006.01) |

(Continued)

(52) U.S. Cl.
CPC .......... *G06F 3/0483* (2013.01); *G06F 1/1616* (2013.01); *G06F 1/1647* (2013.01); *G06F 1/1652* (2013.01); *G06F 3/016* (2013.01); *G06F 3/017* (2013.01); *G06F 3/147* (2013.01); *G06F 3/1423* (2013.01); *G09G 3/2003* (2013.01); *G09G 3/32* (2013.01); *H04N 5/232* (2013.01); *H04N 5/247* (2013.01); *G09G 2370/16* (2013.01); *G09G 2380/02* (2013.01); *G09G 2380/14* (2013.01)

(58) Field of Classification Search
CPC .... G06F 3/0483; G06F 1/1652; G06F 1/1654; G06F 3/016; G09G 2370/16; G09G 2380/02; G09G 2380/14
See application file for complete search history.

(56) References Cited

U.S. PATENT DOCUMENTS

| | | | |
|---|---|---|---|
| 6,124,851 A * | 9/2000 | Jacobson | B41J 3/407 345/100 |
| 6,680,725 B1 | 1/2004 | Jacobson | |

(Continued)

FOREIGN PATENT DOCUMENTS

KR       20160003524 A       1/2016

OTHER PUBLICATIONS

International Search Report and Written Opinion for International Patent Application No. PCT/US2017/033214, dated Aug. 16, 2017, 20 pages.

(Continued)

*Primary Examiner* — Michael Pervan
(74) *Attorney, Agent, or Firm* — Jordan IP Law, LLC

(57) ABSTRACT

Systems, apparatuses and methods may provide for an electronic spine and one or more digital pages removably attached to the electronic spine, wherein the one or more digital pages include a first side with a first flexible display and a second side with a second flexible display. In one example, the system may further include a magnetic interface, wherein the digital page is removably attached to the electronic spine via the magnetic interface.

28 Claims, 29 Drawing Sheets

(51) Int. Cl.
  *G09G 3/20* (2006.01)
  *G09G 3/32* (2016.01)
  *H04N 5/232* (2006.01)

(56) References Cited

U.S. PATENT DOCUMENTS

| | | | | |
|---|---|---|---|---|
| 7,154,452 | B2* | 12/2006 | Nakamura | G06F 1/1615 345/1.1 |
| 7,249,324 | B2* | 7/2007 | Nakamura | G06F 1/1616 345/1.1 |
| 7,495,633 | B2* | 2/2009 | Oku | G06F 1/1601 345/2.3 |
| 8,613,061 | B2* | 12/2013 | Dvorak | G06F 1/1647 380/282 |
| 9,047,799 | B2* | 6/2015 | Yamazaki | G09G 3/20 |
| 2002/0055938 | A1* | 5/2002 | Matsuo | G09B 5/02 |
| 2004/0070633 | A1* | 4/2004 | Nakamura | G06F 3/1423 715/860 |
| 2008/0079692 | A1 | 4/2008 | Liang et al. | |
| 2010/0066685 | A1 | 3/2010 | Cain et al. | |
| 2013/0082917 | A1* | 4/2013 | Hsieh | G06F 3/1423 345/156 |
| 2014/0247546 | A1* | 9/2014 | Whitt, III | G06F 1/1618 361/679.17 |
| 2014/0285433 | A1* | 9/2014 | Park | G06F 3/0487 345/156 |
| 2016/0068002 | A1 | 3/2016 | Keller | |
| 2016/0125837 | A1* | 5/2016 | Huang | G06F 3/1438 345/3.1 |
| 2016/0284497 | A1* | 9/2016 | Stryker | G06F 1/16 |

OTHER PUBLICATIONS

Cindi May, "A Learning Secret: Don't Take Notes with a Laptop", Scientific American, Jun. 3, 2014, 7 pages, Scientific American.

"The Reading Brain in the Digital Age: The Science of Paper versus Screens," Scientific American, Jun. 2, 2016, 8 pages, Scientific American.

Phil Wahba, "E-book Sales Plummet as Print Stages Comeback: Book Sales Hang on as E-books Wither," Sep. 23, 2015, 2 pages, fortune.com/2015/09/23/e-books-digital-publishing/.

"Our Truly Flexible Transistor Technology Platform," FlexEnable Limited, 3 pages, flexenable.com/technology/.

"Flexible Display," Wikipedia, May 5, 2016, 11 pages, en.wikipedia.org/wiki/Flexible_display.

Anne Chemin, "Handwriting vs. Typing: Is the Pen Still Mightier Than the Keyboard?," Dec. 16, 2014, 4 pages, The Guardian, theguardian.com/science/2014/dec/16/cognitive-benefits-handwriting-decline-typing.

"What Is Infrared?," Infrared Data Association, Jun. 3, 2016, 2 pages, irda.org/.

"Laserprocessing of Glass," CERION, 2014, 18 pages, cerion-laser.com, Minden, Germany.

"Global Internet Access for the Next Four Billion," On Point, Jun. 3, 2016, 15 pages, onpoint.wbur.org/2015/09/24/internet-access-next-four-billion.

Tarun et al., "PaperTab: An Electronic Paper Computer with Multiple Large Flexible Electrophoretic Displays," Apr. 27-May 2, 2013, pp. 3131-3134, CHI 2013 Extended Abstracts.

Nancy Owano, "Mobile Input Device Phree Invites You to Jot, Sketch, Take Notes," May 21, 2015, 3 pages, phys.org/news/2015-05-mobile-device-phree-jot.html.

"Polyera Digital Fabric Technology," Polyera, Jun. 2, 2016, 4 pages, polyera.com/index.html.

Strohmeier et al., "ReFlex: A Flexible Smartphone with Active Haptic Feedback for Bend Input," Feb. 14-17, 2016, 8 pages, dx.doi.org/10.1145/2839462.2839494.

"Strain Gauge," Wikipedia, May 17, 2016, 6 pages, en.wikipedia.org/wiki/Strain_gauge.

Natalie Gagliordi, "Tablet Shipments to Fall 8.1 Percent to 211.3 Million Units in 2015: IDC," Dec. 1, 2015, 2 pages, ZDNet, zdnet.com/article/tablet-shipments-to-fall-8-1-percent-to-211-3-million-units-in-2015-idc./.

Asi Sharabi, "Tablets Make It Nearly Impossible for Kids to Get Lost in a Story," Dec. 18, 2013, 5 pages, The Atlantic, theatlantic.com/education/archive/2013/12/tablets-make-it-nearly-impossible-for-kids-to-get-lost-in-a-story/282469/.

Alexandra Alter, "The Plot Twist: E-Book Sales Slip, and Print Is Far From Dead," Sep. 22, 2015, 5 pages, The New York Times, nytimes.com/2015/09/23/business/media/the-plot-twist-e-book-sales-slip-and-print-is-far-from-dead.html?_r=1.

International Preliminary Report on Patentability for International Patent Application No. PCT/US2017/033214, dated Jan. 3, 2019, 9 pages.

* cited by examiner

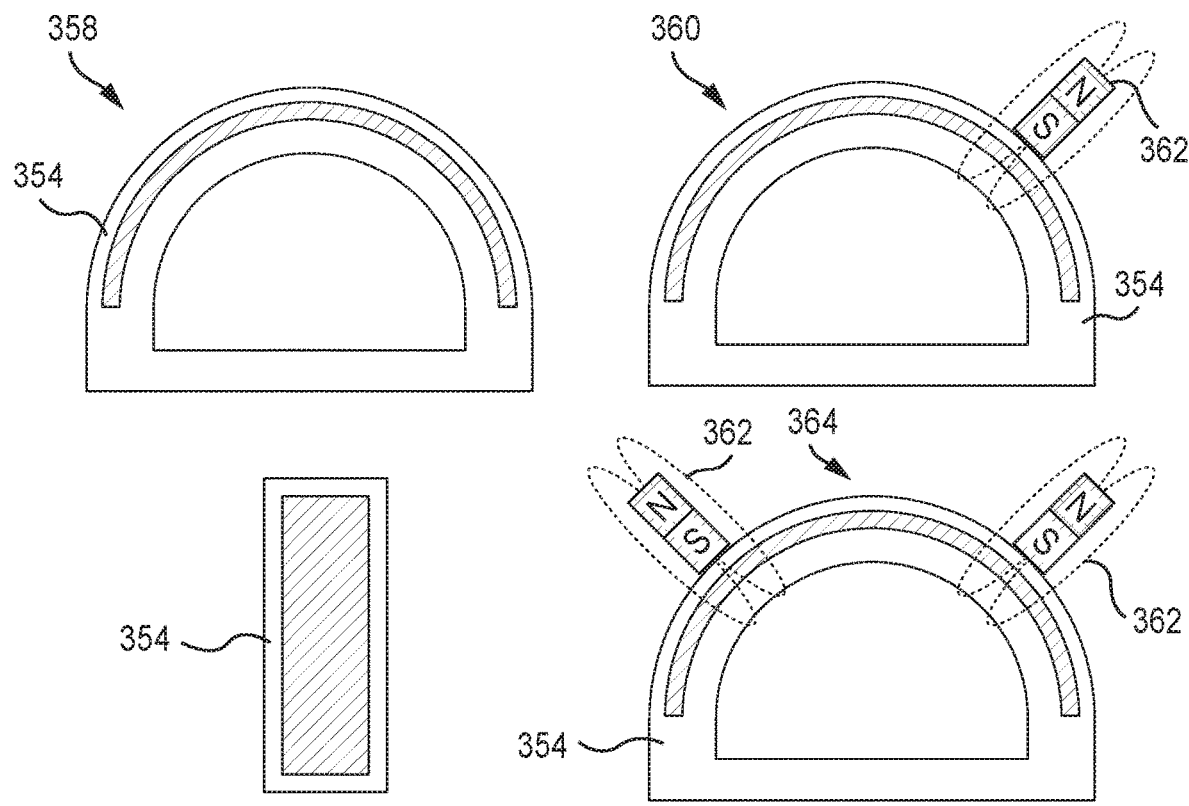
FIG.20C
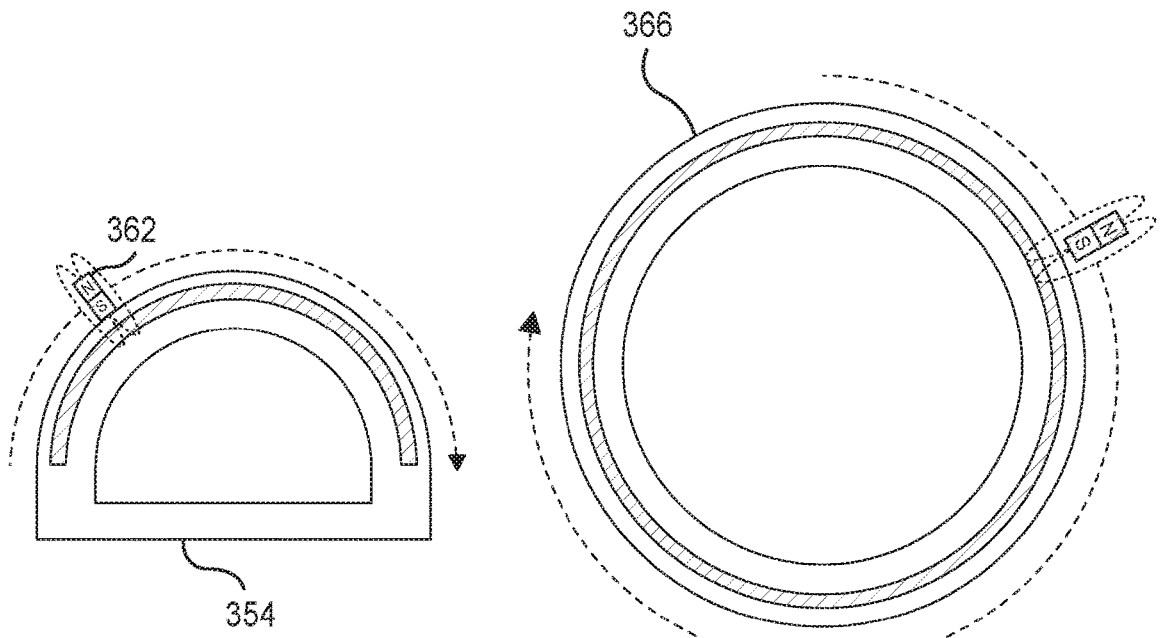
FIG.20D
FIG.20E

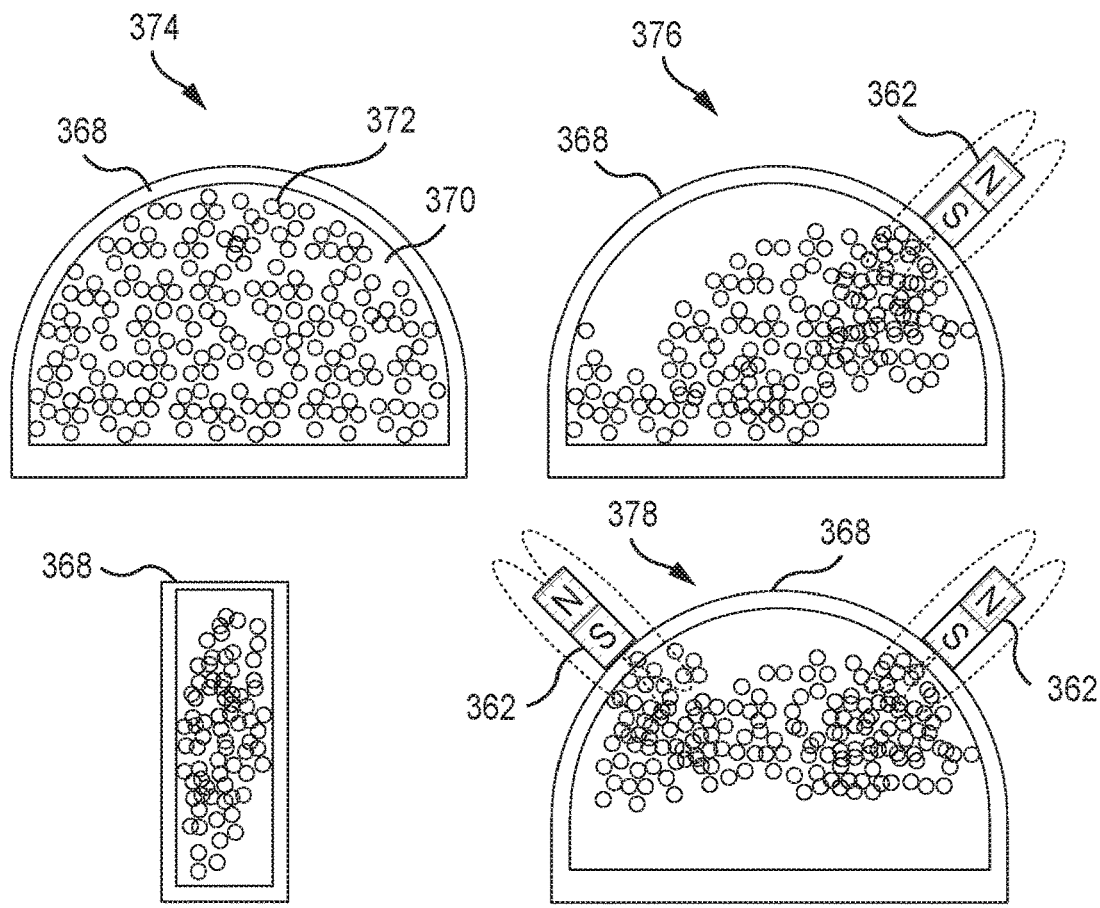
FIG.21A
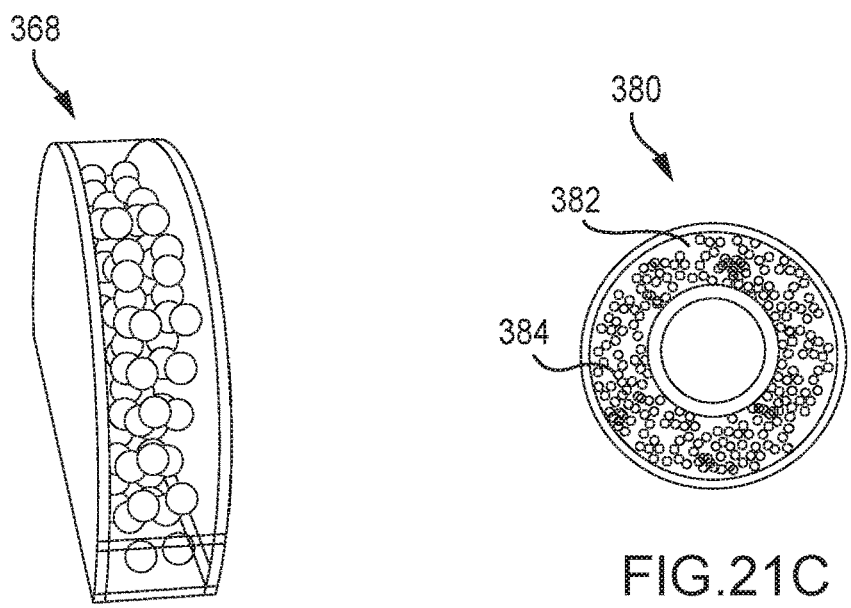
FIG.21B
FIG.21C

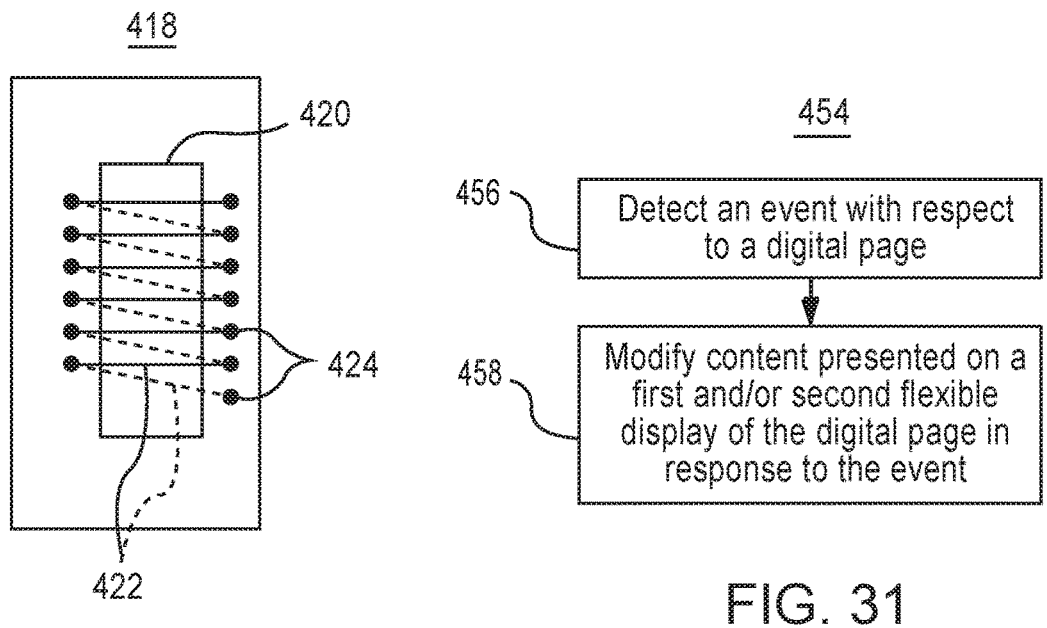
FIG. 29
FIG. 31
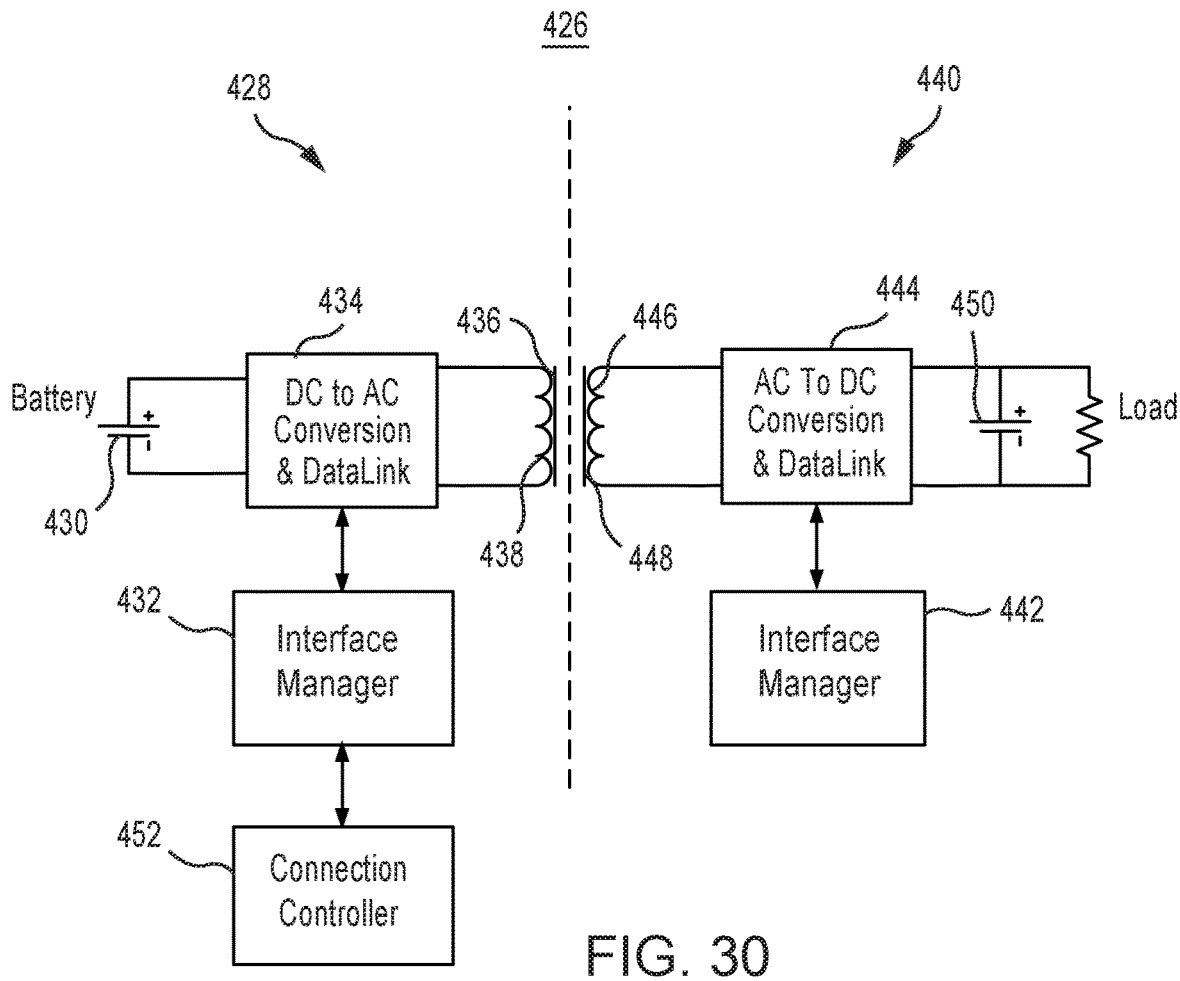
FIG. 30

SMARTBOOK SYSTEM HAVING A SYNERGISTIC PAGE, SPINE, EDGE EXTENSION AND POWER DESIGN

TECHNICAL FIELD

Embodiments generally relate to the use of interactive mobile systems to emulate print media. More particularly, embodiments relate to a smartbook system having a synergistic page, spine, edge extension and power design.

BACKGROUND

Printed media such as textbooks, novels, magazines, newspapers and notebooks may be used to both consume and create information. While recent mobile device designs may have addressed physical space challenges of printed media, there remains considerable room for improvement. For example, conventional mobile devices may fail to accurately mimic the user experience of interacting with printed media. As a result, both information consumption and information creation scenarios may be suboptimal from the perspective of the user.

BRIEF DESCRIPTION OF THE DRAWINGS

The various advantages of the embodiments will become apparent to one skilled in the art by reading the following specification and appended claims, and by referencing the following drawings, in which:

FIG. 20C is a set of views of a magnetic segment in various page connection arrangements according to an embodiment;

FIG. 20D is an end view of an example of an interaction between a magnetized shoulderband and a magnetic segment having a half cylinder shape according to an embodiment;

FIG. 20E is an end view of an example of an interaction between a magnetized shoulderband and a magnetic segment having a cylinder shape according to an embodiment;

FIG. 21A is a set of views of a magnetic segment having a metallic agent floating in a fluid in various page connection arrangements according to an embodiment;

FIG. 21B is a cutaway perspective view of an example of a magnetic segment having a metallic agent according to an embodiment;

FIG. 21C is an end view of an example of a magnetic segment having a cylinder shape and a metallic agent floating in a fluid according to an embodiment;

FIG. 29 is an illustration of an example of a wire and vias pattern according to an embodiment;

FIG. 30 is a schematic diagram of an example of a communication interface and power delivery interface according to an embodiment; and FIG. 31 is a flowchart of an example of a method of operating a mobile system according to an embodiment.

DESCRIPTION OF EMBODIMENTS

Figure 1:
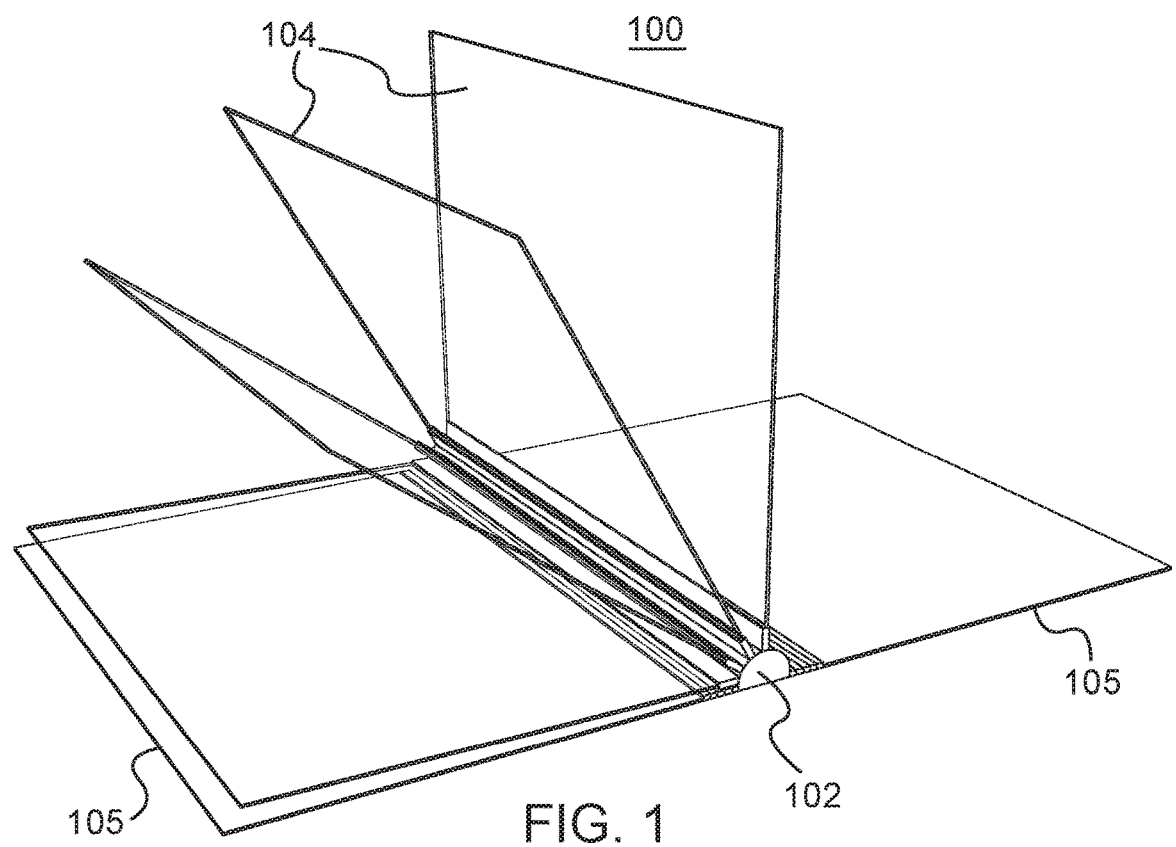
FIG. 1 is a perspective view of an example of a mobile system having an electronic spine with a substantially smooth exterior surface and a half cylinder shape according to an embodiment.

Turning now to FIG. 1, an interactive mobile system 100 is shown in which a plurality of flexible digital pages 104 are removably attached to an electronic spine 102. The mobile system 100 may be considered a "smartbook" to the extent that it closely emulates print media such as, for example, a textbook, novel, magazine, newspaper, notebook, etc., while providing a number of advantages over conventional print media. For example, each flexible digital page 104 may include a flexible display on both sides of the page 104, wherein the content presented on the displays is programmable based on the manner in which the system 100 is being used. Thus, the dual-sided nature of the digital pages 104 enables the user of the system 100 to have a traditional "page-turn" experience, while a relatively large amount of content (e.g., volumes) may be condensed into a much smaller physical space.

Moreover, the ability to detach and reattach the digital pages 104 may result in a "notebook-like" experience in which the user may take notes and/or share content with other individuals. In the illustrated example, the outer profile of the electronic spine 102 is substantially formed in a half cylinder shape, although other shapes may be used. Additionally, the electronic spine 102 includes a substantially smooth exterior surface in the illustrated example. Such a configuration may enable shoulderbands (e.g., mechanical interfaces positioned at inner edges) of the digital pages 104 to be slidable around the perimeter of the electronic spine 102. Other configurations may also be used, as will be discussed in greater detail.

The mobile system 100 may also include one or more rigid covers 105 (e.g., front and back covers) that provide mechanical stability, privacy and/or protection to the digital pages 104. As will be discussed in greater detail, the rigid covers 105 may be active (e.g., with touch screens), passive, or any combination thereof. The electronic spine 102 may also be used to charge and/or power the digital pages 104 via an inductive charging interface (not shown). In one example, the removable attachment between the electronic spine 102 and the digital pages 104 is achieved via a magnetic interface (not shown).

Figure 2A:
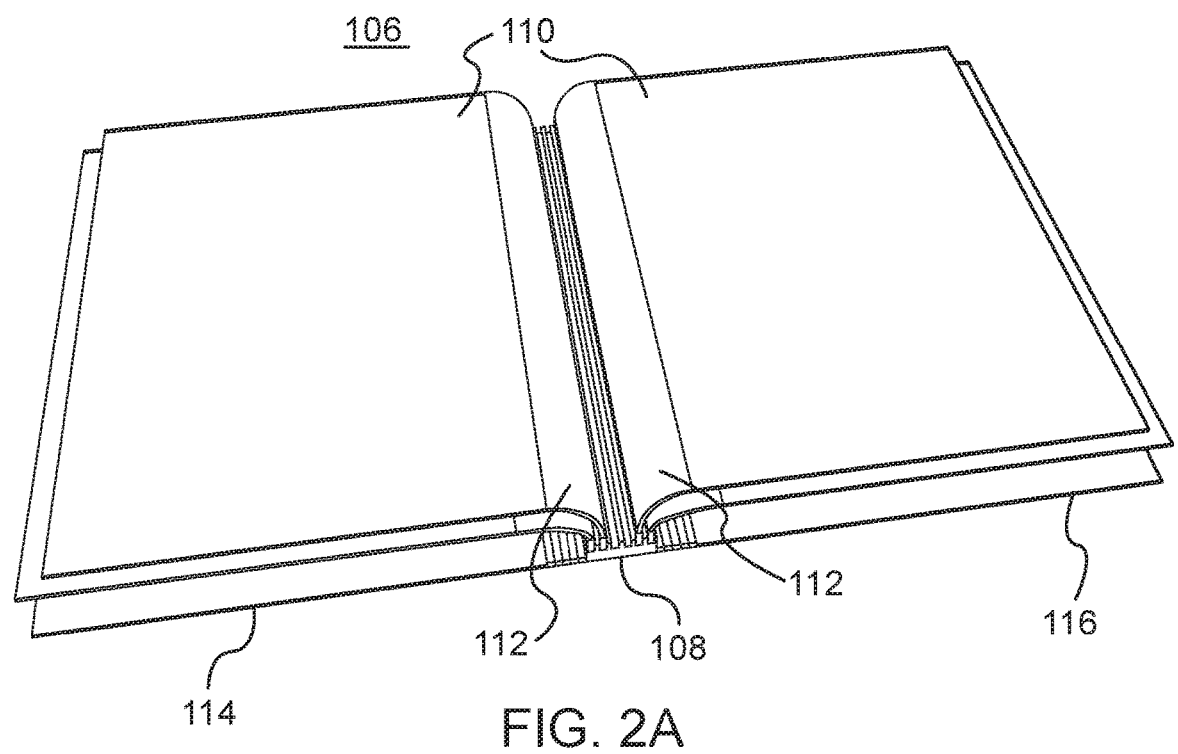
FIGS. 2A and 2B are open and closed perspective views, respectively, of an example of a mobile system having an electronic spine with surfaces defining a plurality of sockets according to an embodiment.
Figure 2B:
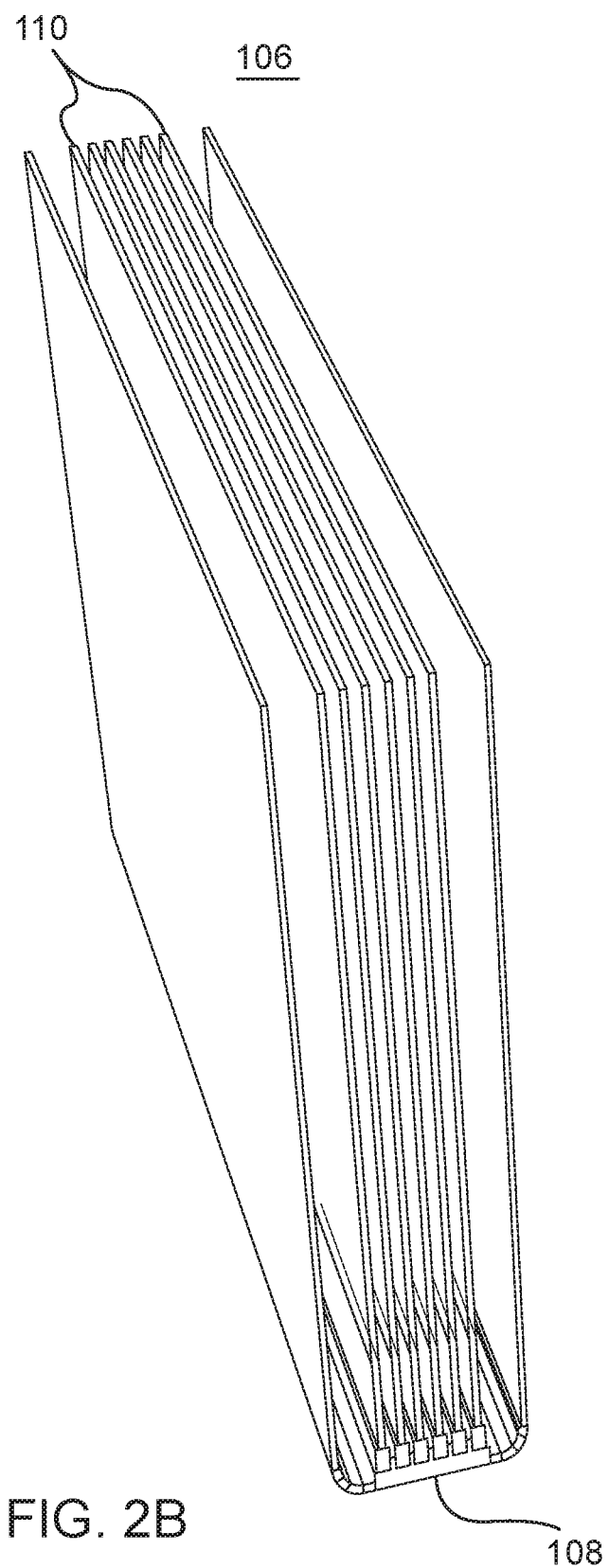

FIGS. 2A and 2B show open and closed perspective views, respectively, of an interactive mobile system having a different configuration from the mobile system 100 (FIG. 1). In the illustrated example, an electronic spine 108 includes surfaces defining a plurality of sockets, wherein the shoulderbands of digital pages 110 are positioned within the sockets. In such a case, the digital pages 110 may also include elastic headbands 112 positioned between the shoulderbands and a region of the digital pages 110 that includes the front and back displays. The elastic headbands 112 may therefore increase flexibility at the interface between the digital pages 110 and the electronic spine 108 (e.g., bridging the 90° bending turn) in order to more closely approximate the page-turn experience from the perspective of the user. The illustrated system 106 also includes a front cover 114 and a back cover 116, wherein the covers 114, 116 are substantially rigid (e.g., to facilitate handling, enhance privacy and/or provide protection).

Figure 3:
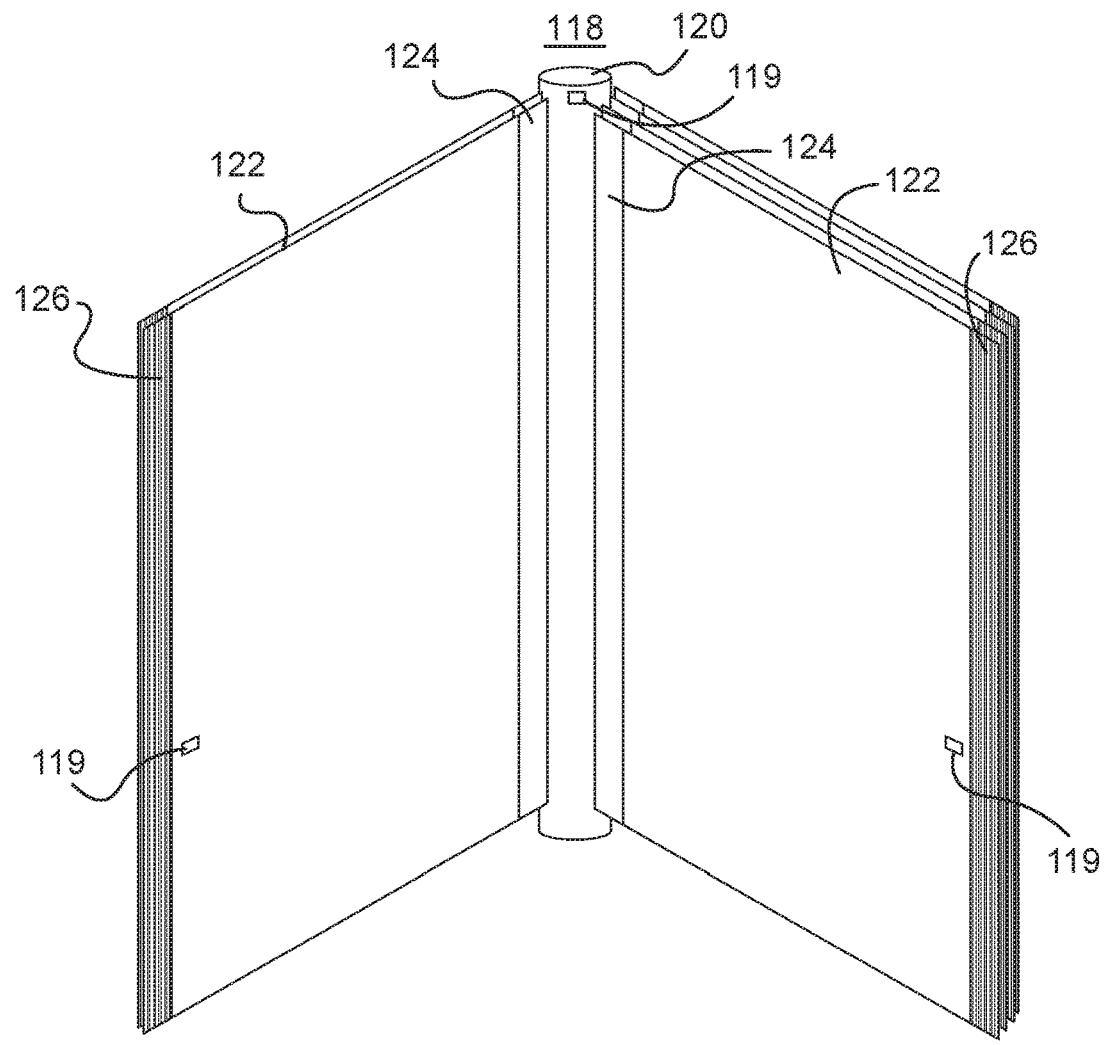
FIG. 3 is a perspective view of an example of a mobile system having an electronic spine with a substantially smooth exterior surface and a cylinder shape according to an embodiment.

FIG. 3 shows another interactive mobile system 118 that includes an electronic spine 120 with an outer profile that is substantially formed in a cylinder shape. Accordingly, shoulderbands 124 of digital pages 122 are able to slide around the entire 360° perimeter of the electronic spine 120 in an "infinity page-turn" fashion. Thus, the illustrated mobile system 118 might be particularly advantageous in a newspaper emulation scenario. As will be discussed in greater detail, the digital pages 122 may also include flexible extensions 126 coupled to the outer edges of the digital pages 122, wherein the flexible extensions 126 enable the user to further interact with the mobile system 118 (e.g., selecting pages, triggering communications with other pages/devices, etc.).

FIG. 3 also demonstrates that one or more cameras 119 may be incorporated into the mobile system 118. In the illustrated example, the cameras 119 are coupled to the electronic spine 120 as well as the flexible displays of the digital pages 122. Accordingly, the combination of multiple pages 122 together may form a three-dimensional (3D) image capture array with adjustable angles. A large aperture that can be changed by the user may be particularly advantageous for 3D scene generation, object recognition, scanning, etc. In this regard, the electronic spine 120 may determine the position of the digital pages 122 based on signals from one or more of the cameras 119. Such an approach may be useful when conducting stereoscopic camera image processing.

Figure 4:
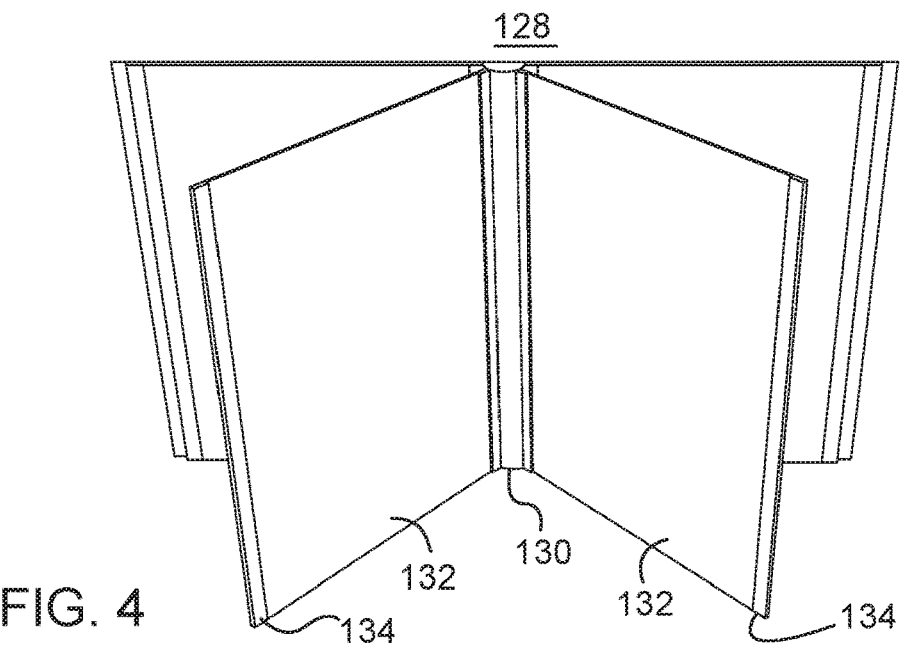
FIG. 4 is a perspective view of an example of a mobile system having a half cylinder shaped electronic spine and digital pages with an edge extension according to an embodiment.

Turning now to FIG. 4, another interactive mobile system 128 is shown. In the illustrated example, an electronic spine 130 is substantially formed in a half cylinder shape and digital pages 132 include flexible extensions 134 coupled to outer edges of the display portions of the digital pages 132. The illustrated system 128 is therefore similar to the mobile system 100 (FIG. 1), already discussed, with the addition of the flexible extensions 134.

Figure 5A:
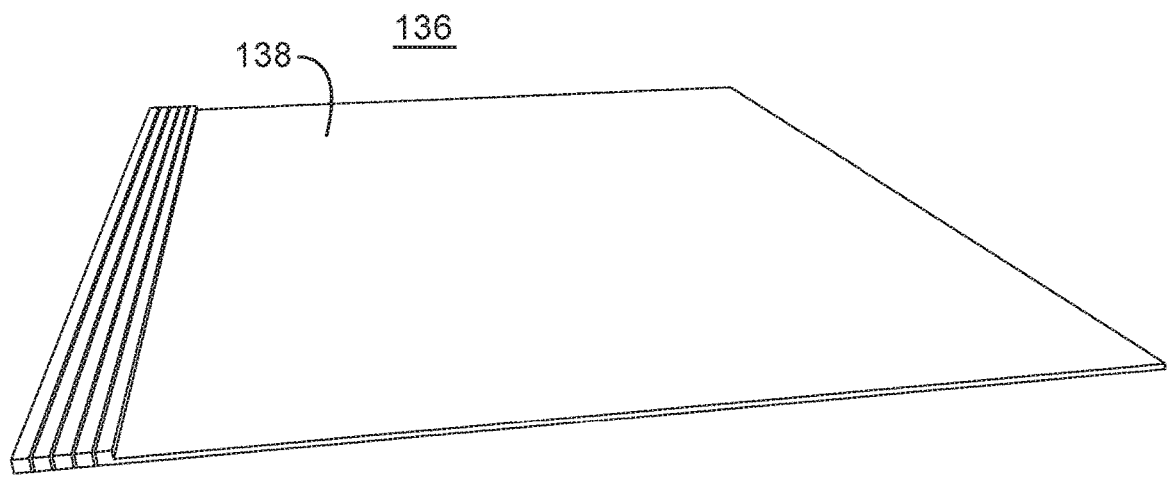
FIG. 5A is a perspective view of an example of a rigid cover according to an embodiment.

FIG. 5A shows a rigid cover 136 (e.g., front cover, back cover) that may be used to provide mechanical stability, privacy and/or protection to the digital pages of an interactive mobile system. In the illustrated example, the rigid cover 136 includes a substantially non-flexible display that may be used to visually present information such as, for example, a book cover or other customizable message. The display may include a touch screen. Moreover, a second display or other active surface (e.g., EINK providing a morphic appearance) may be positioned on the other side of the rigid cover 136.

Figure 5B:
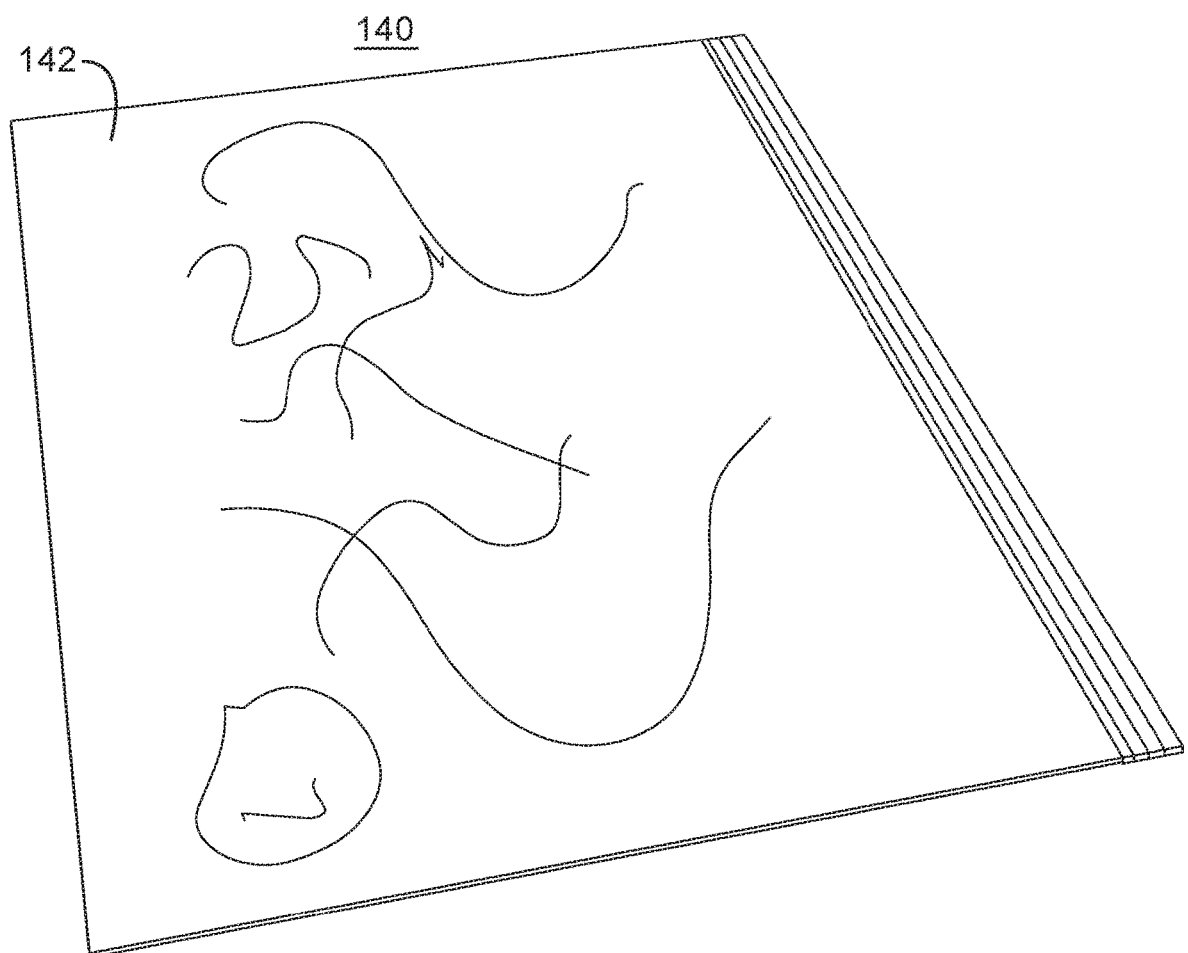
FIG. 5B is a perspective view of an example of a rigid cover with a customizable exterior surface according to an embodiment.

FIG. 5B shows a rigid cover 140 (e.g., front cover, back cover) that may also be used to provide mechanical stability, privacy and/or protection to the digital pages of an interactive mobile system. In the illustrated example, the rigid cover 136 is a passive cover that includes a customizable exterior surface 142 such as, for example, fabric, leather, canvas, acrylic (e.g., PLEXIGLAS), etc., or any combination thereof.

Figure 6:
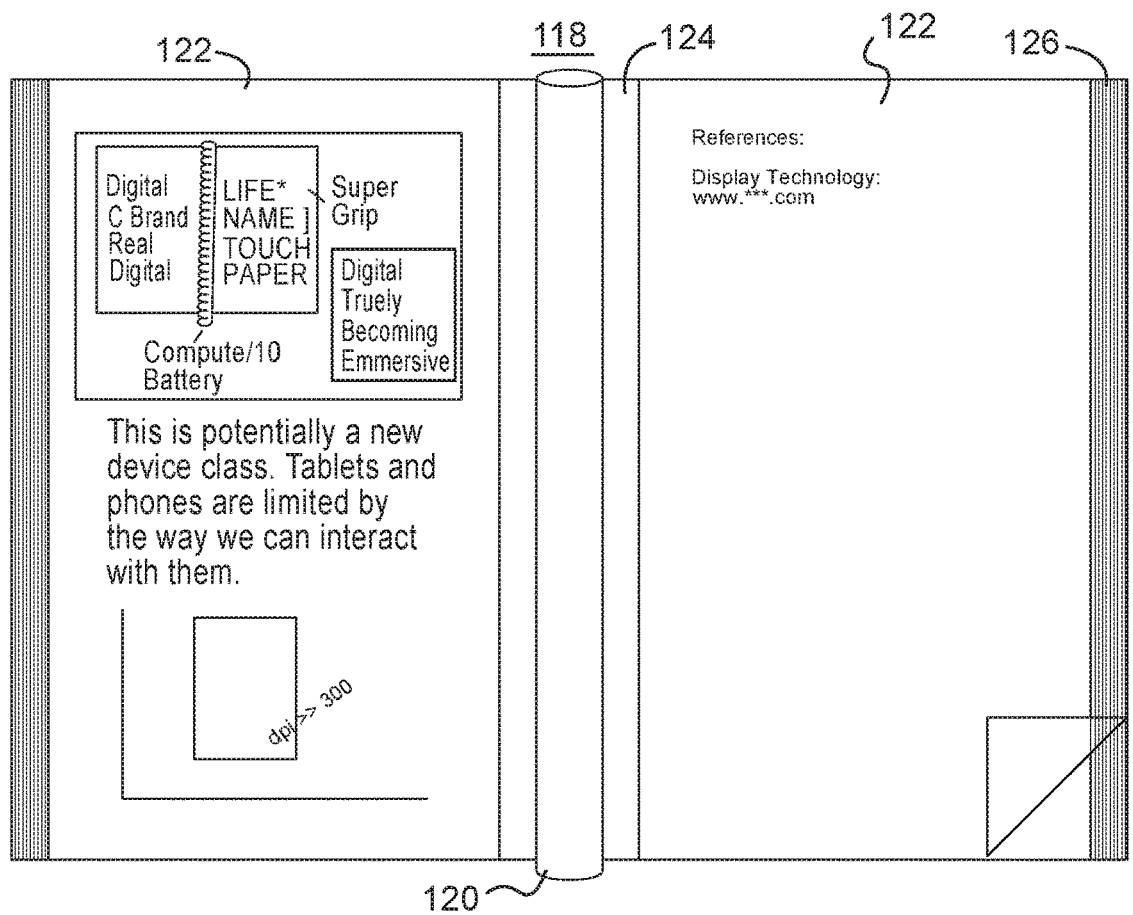
FIG. 6 is a plan view of an example of a digital page with a folded corner according to an embodiment.

Turning now to FIG. 6, a usage example of the mobile system 118 is shown (see also FIG. 3), wherein a corner of a rightmost digital page 122 is bent (e.g., by the user). A flexible extension 126 may detect the bending of the corner of the digital page 122 and trigger the simulation of a page turn (e.g., one page or several pages) in response to the bend. Of particular note is that user manipulation of the flexible extension 126 enables page turns to take place without the user swiping a finger across the display or otherwise occluding the presented content. As a result, the reading (e.g., content consumption) process may continue in an uninterrupted fashion. In the illustrated example, both predetermined (e.g., published) and extemporaneous (e.g., handwritten) content are visually presented on the flexible displays of the digital pages 122. Moreover, the cylindrical form factor of the electronic spine 120 may enable the mobile system 118 to be rolled up (e.g., as in a magazine) for carrying, stowage, etc.

Figure 7:
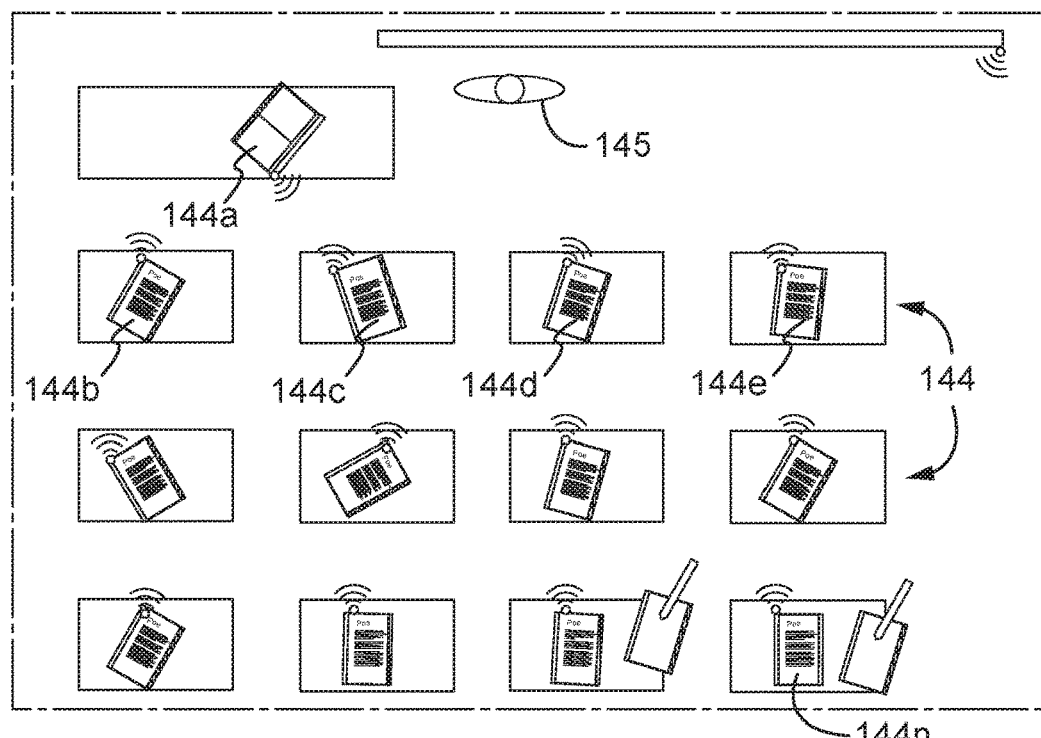
FIG. 7 is an illustration of an example of a plurality of digital pages communicating with one another according to an embodiment.

FIG. 7 shows a plan view of an environment (e.g., classroom) in which multiple digital pages 144 (144a-144n) are detached from an interactive mobile system and distributed by, for example, an instructor 145, to different individuals (not shown) in the environment. In the illustrated example, the digital pages 144 communicate wirelessly with one another in order to exchange data (e.g., published content, handwritten content, notes, bookmarks, highlights). Thus, various portions of a test/exam booklet might be worked on/read by different individuals in the illustrated example by sending the appropriate content to the respective digital page 144. The illustrated solution therefore enables progressing of a test in episodes or more individualized testing based on student profiles (e.g., individual learning experience/focus based on student talents). In one example, the tabletops on which the digital pages 144 are placed may be used to charge and/or power the digital pages 144 via a secondary inductive charging interface (not shown).

Figure 8A:
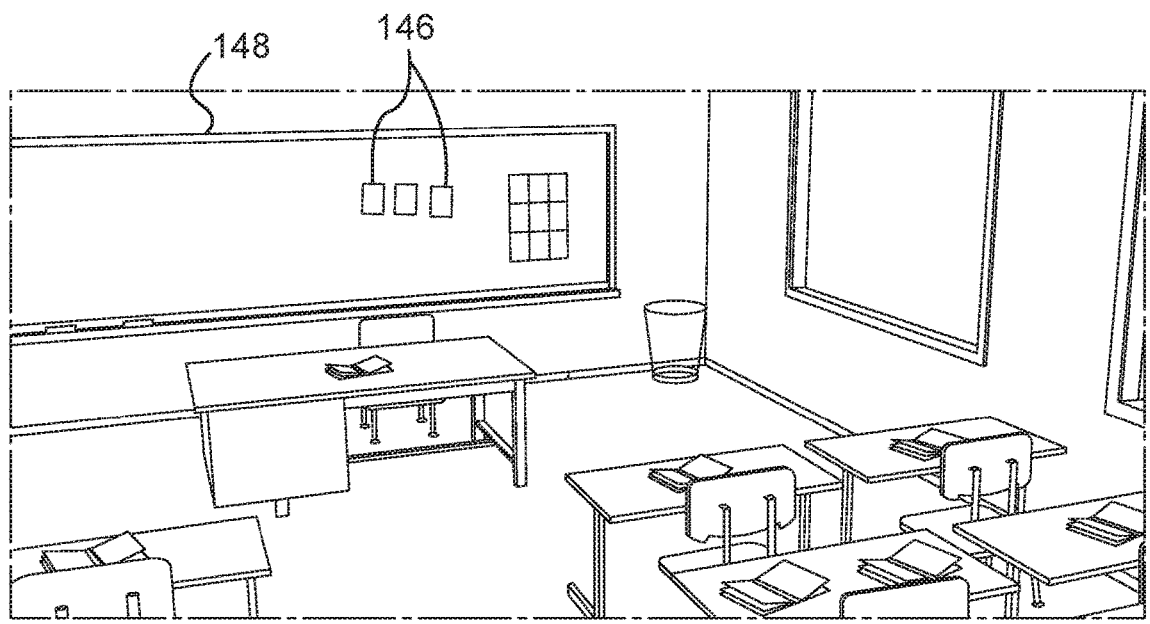
FIGS. 8A and 8B are illustrations of examples of magnetic whiteboard applications according to embodiments.
Figure 8B:
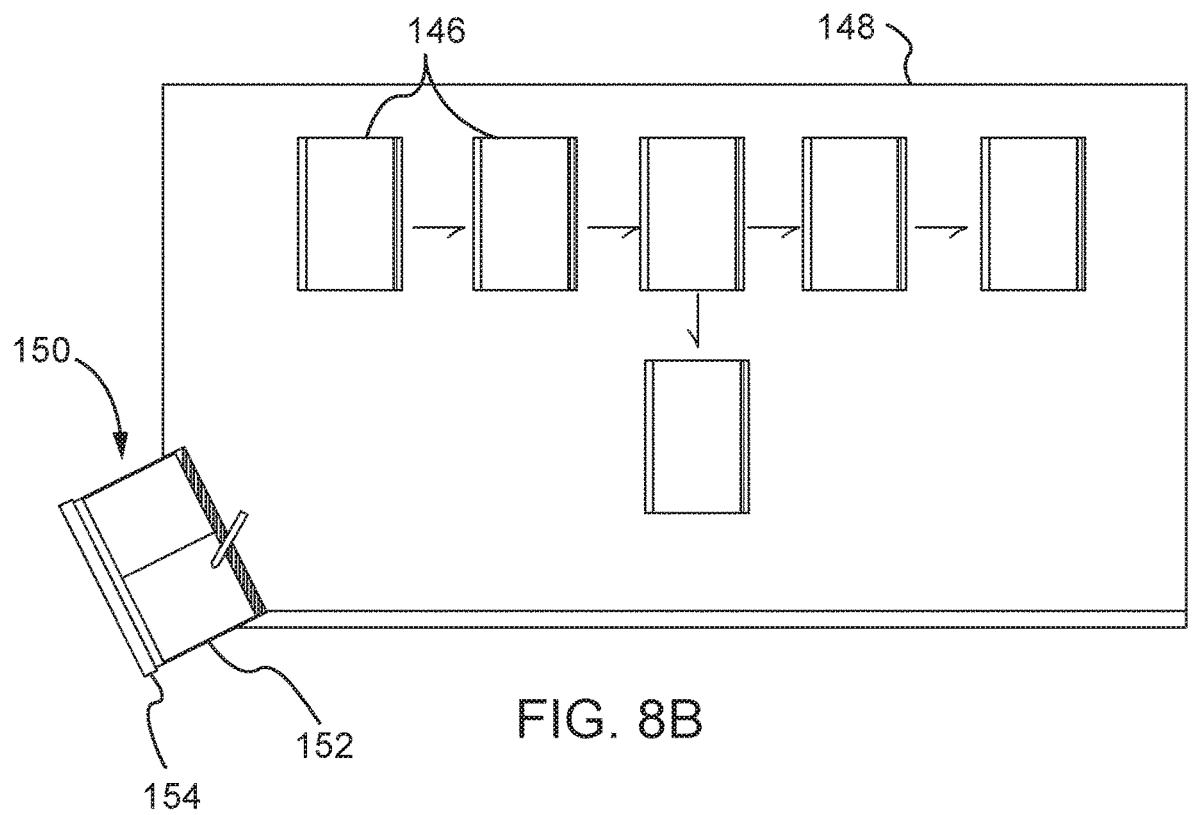

Turning now to FIGS. 8A and 8B, an environment is shown in which digital pages 146 of an interactive mobile system 150 are removably attached (e.g., via a magnetic interface) to a white board 148. The illustrated example demonstrates that the individual digital pages 148 may be arranged to show, for example, relevant imagery (e.g., large images for better visibility), dependencies (e.g., how certain historical figures had impact over time), and so forth. As best shown in FIG. 8B, one or more other digital pages 152 may remain attached to an electronic spine 154 of the mobile system 150 in order to facilitate, for example, note taking on the part of the user.

Figure 9:
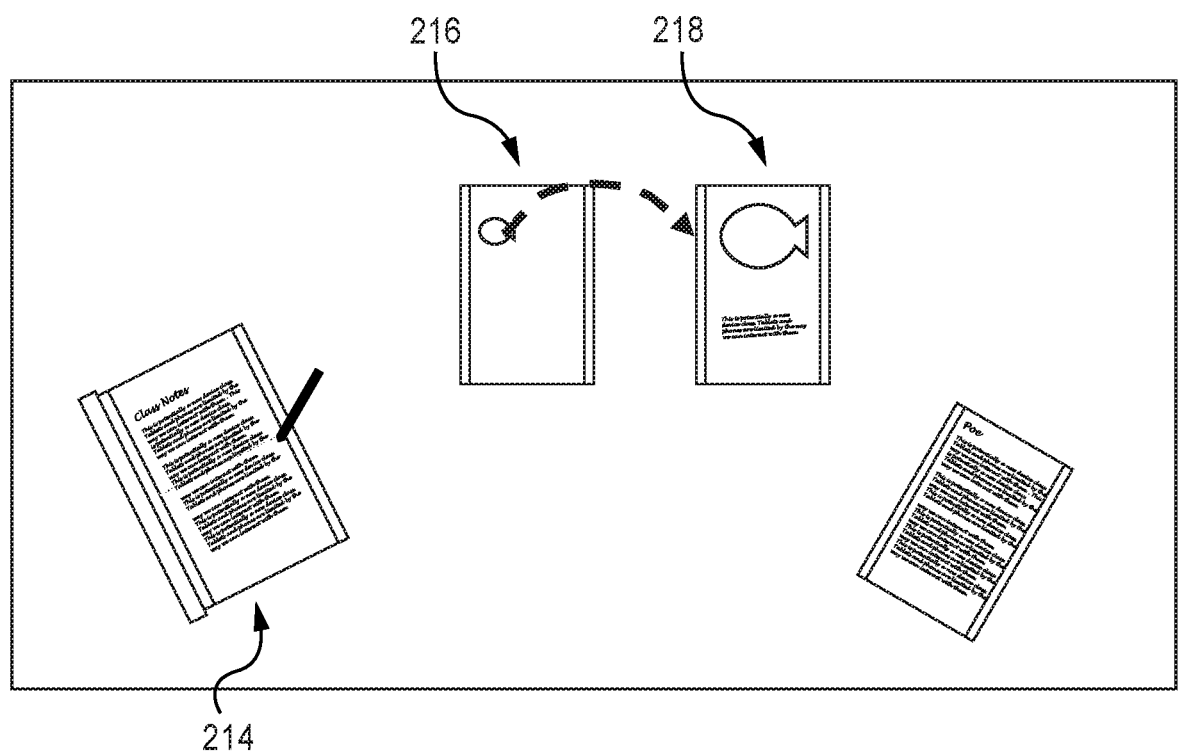
FIG. 9 is an illustration of an example of a transfer of information between digital pages according to an embodiment.

FIG. 9 shows an information transfer usage scenario. In the illustrated example, a first digital page 216 and a second digital page 218 are detached from an interactive mobile system 214. A portion of the content presented on the first digital page 216 may be wirelessly transferred from the first digital page 216 to the second digital page 218.

Figure 10A:
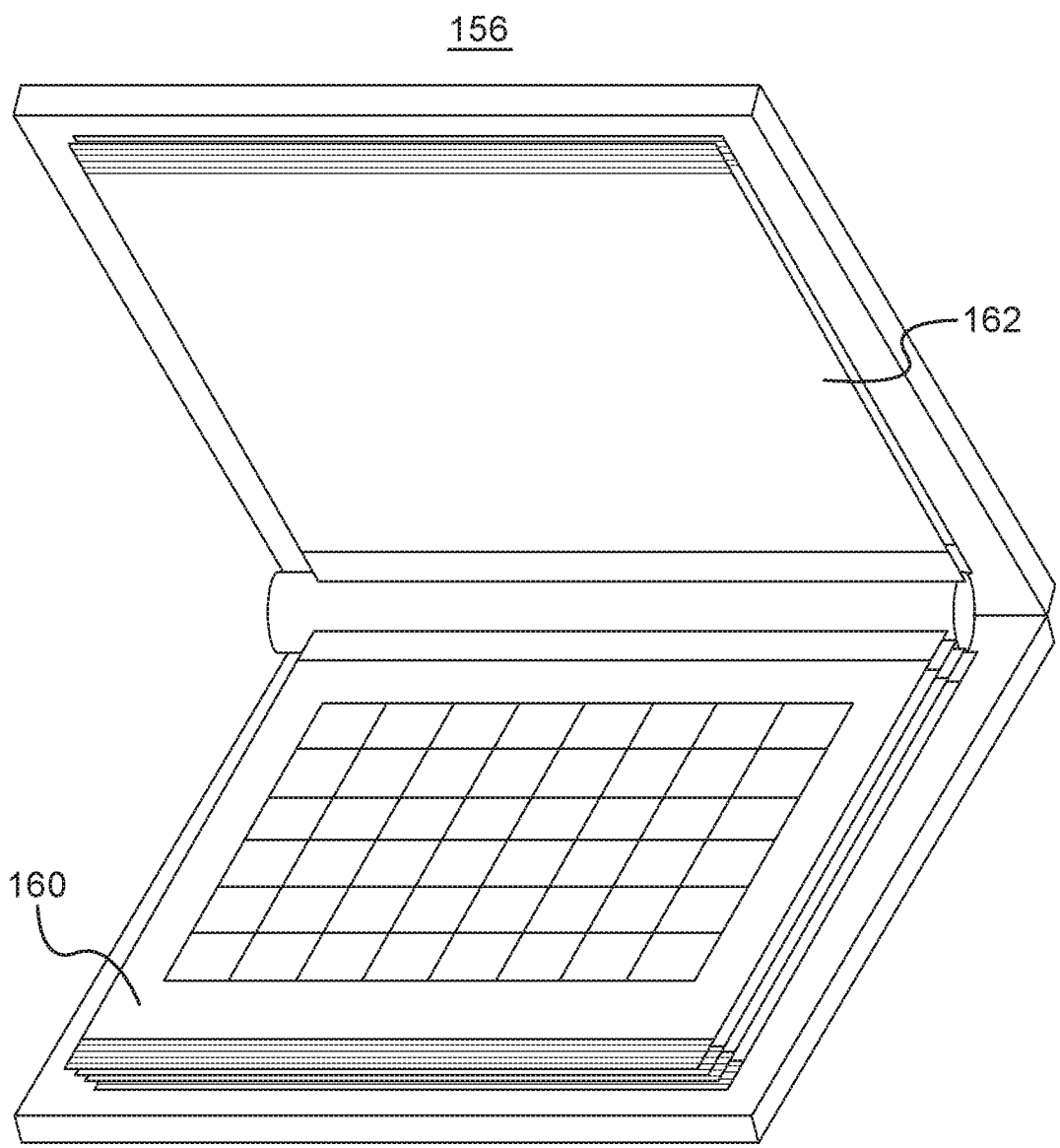
FIGS. 10A-10C are perspective views of example usage configurations of a mobile system according to embodiments.
Figure 10B:
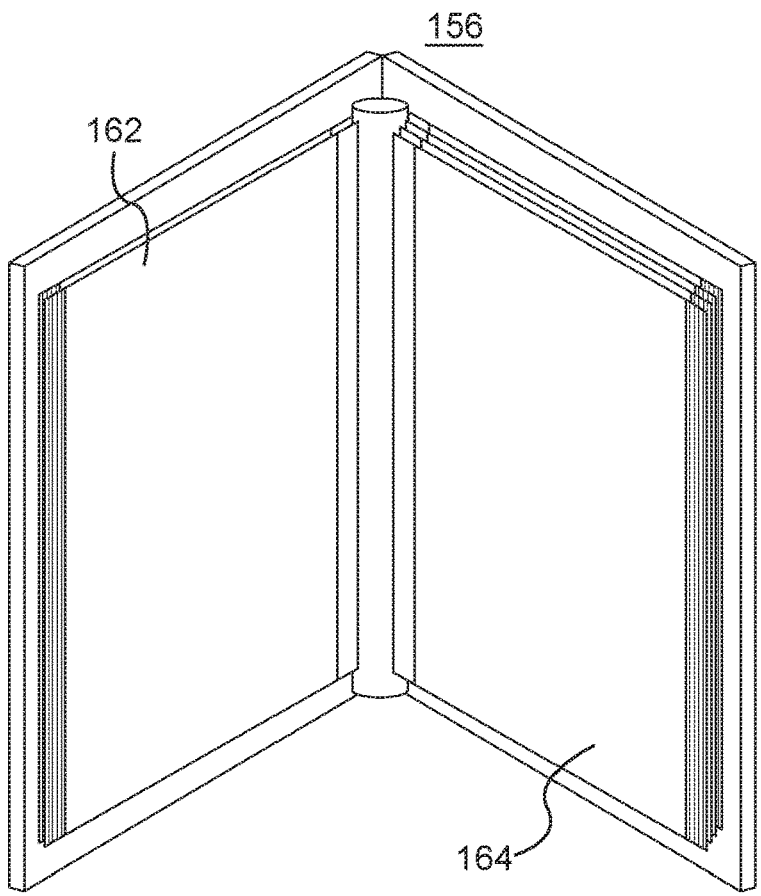
Figure 10C:
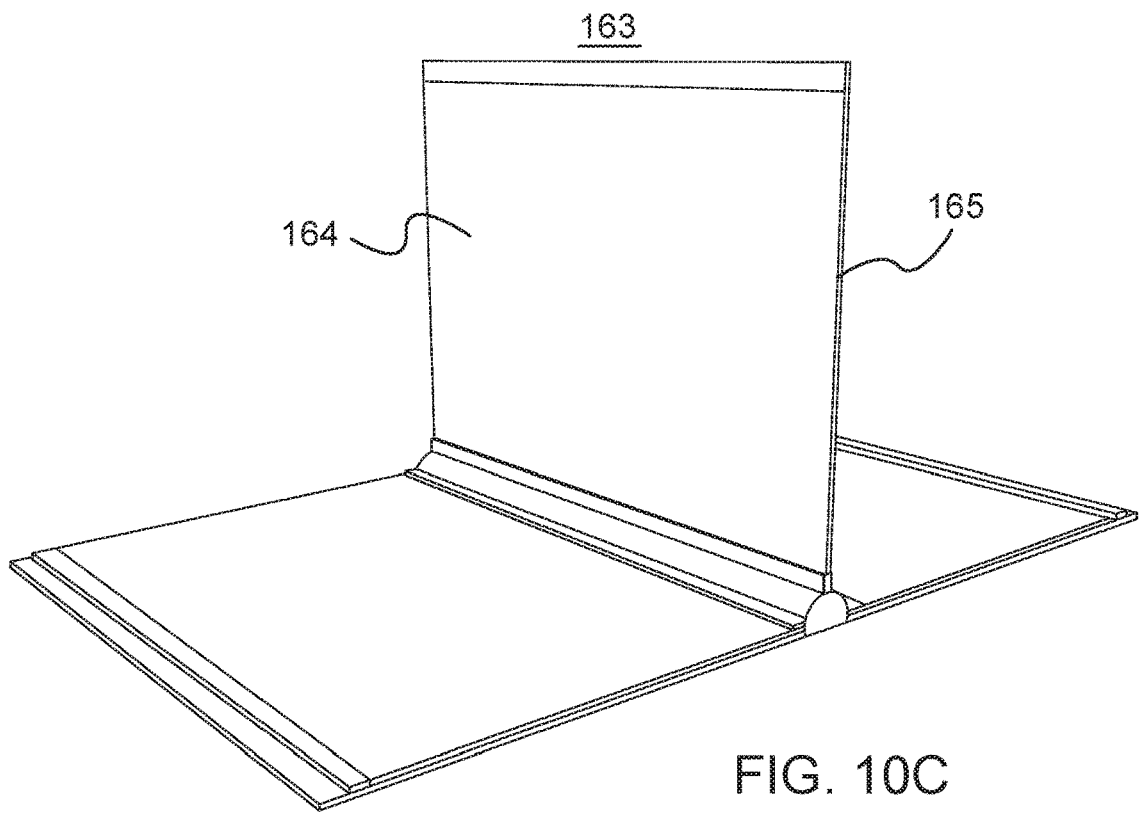

FIGS. 10A-10C show different usage scenarios of interactive mobile systems 156 and 163. For example, FIG. 10A demonstrates that the system 156 may be used as a notebook computer by configuring one digital page 160 to operate as a soft keyboard (or by attaching an accessory keyboard) and configuring another digital page 162 to operate as the display. By contrast, FIG. 10B demonstrates that the system 156 may be used as a book when rotated so that the digital pages 162, 164 present the content of the book. Moreover, FIG. 10C demonstrates that an interactive mobile system 163 may be used in a "head-to-head" scenario (e.g., BATTLESHIP game) in which different content is presented to multiple users viewing opposite sides of the same digital page 164. A mechanical stiffener and/or brace 165 may be added to the digital page 164 to maintain the page 164 in the upright position.

Figure 11A:
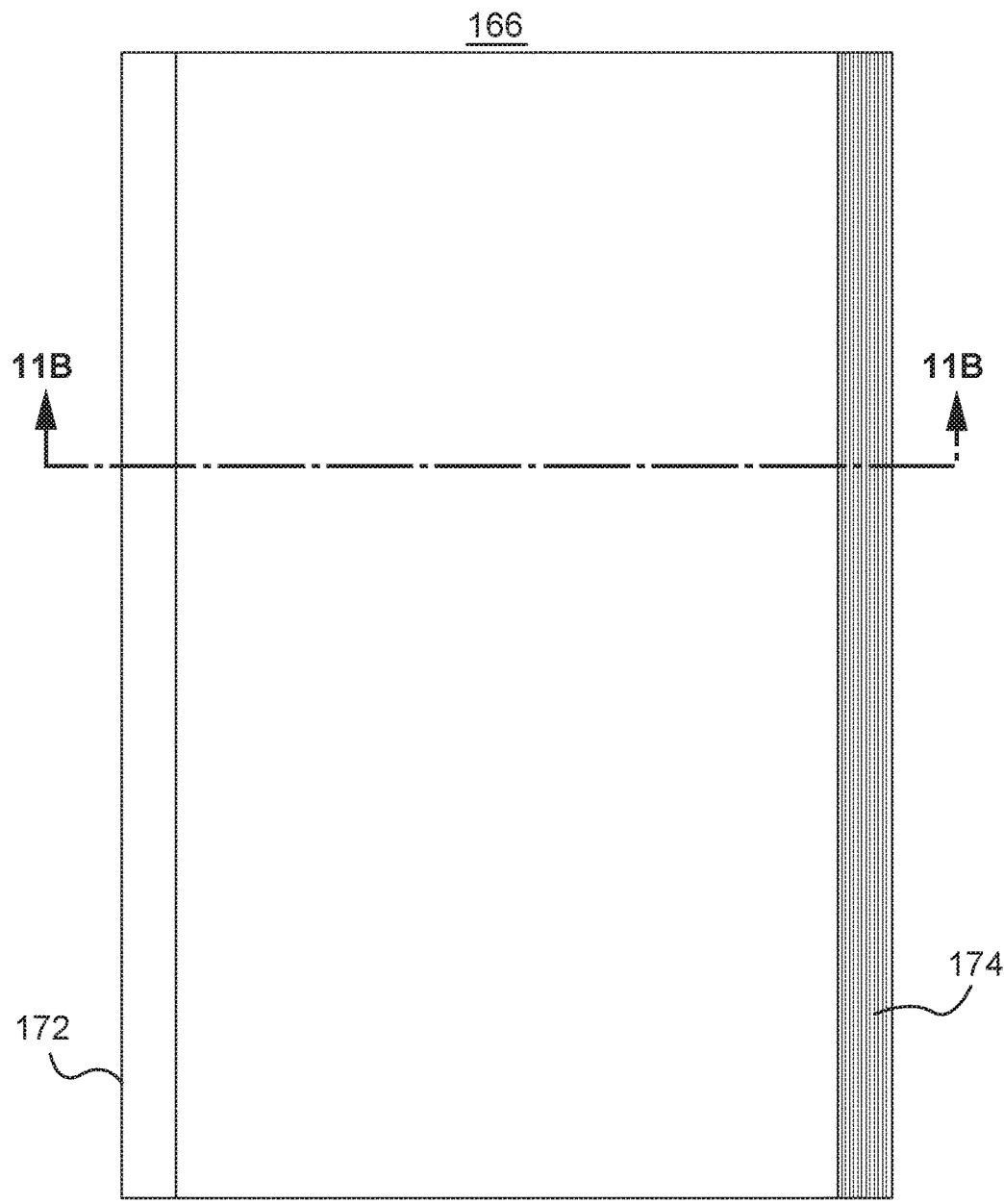
FIG. 11A is a plan view of an example of a digital page according to an embodiment.
Figure 11B:
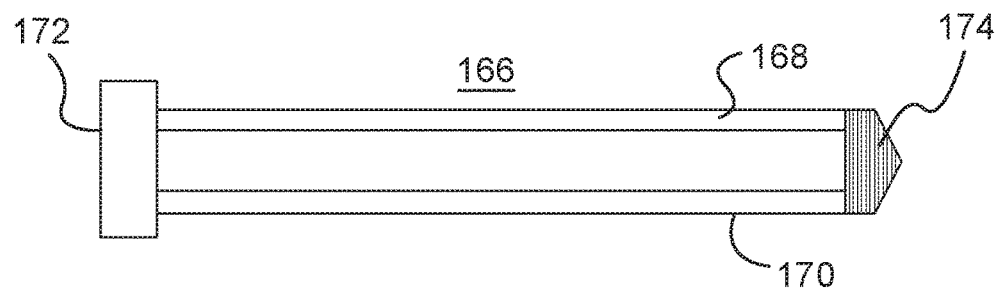
FIG. 11B is a sectional view taken along lines 11B-11B in FIG. 11A according to an embodiment.

Turning now to FIGS. 11A and 11B, a digital page 166 is shown in greater detail. In the illustrated example, a first side of the digital page 166 includes a first flexible display 168 and a second side of the digital page 166 includes a second flexible display 170. Additionally, a shoulderband 172 may be coupled to an inner edge of the display portion and a flexible extension 174 may be coupled to an outer edge of the display portion. As already noted, the shoulderband 172 may function as a removable attachment interface with an electronic spine (not shown). The shoulderband 172 may also support wireless charging and data transmission. In addition, the illustrated flexible extension 174 enables users of the mobile system 166 to select and/or interact with the content presented on the flexible displays 168, 170. The flexible extension 174, which may be substantially formed in a triangular prism shape, may include a textured exterior surface to facilitate grasping by the user.

Figure 11C:
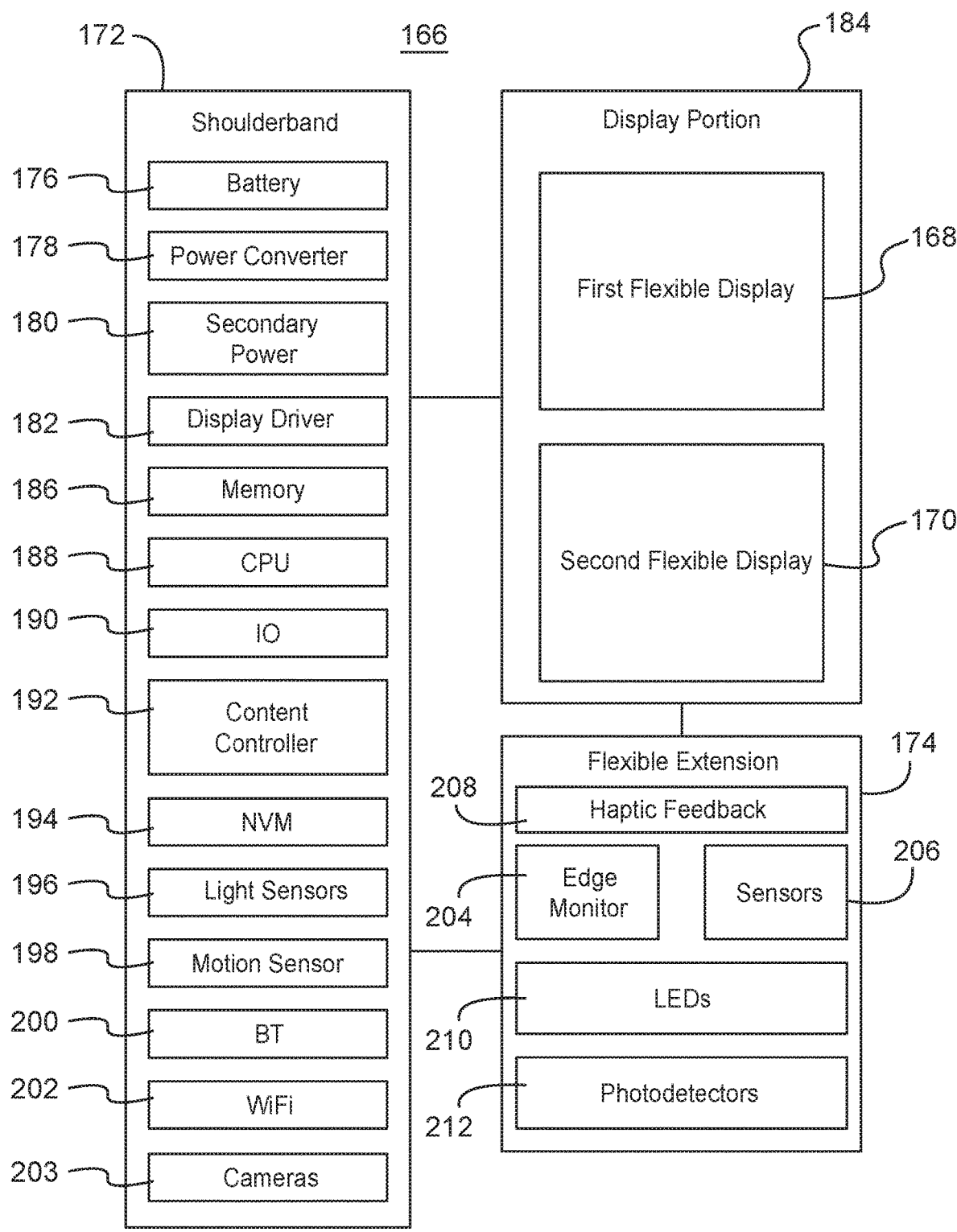
FIG. 11C is a block diagram of an example of a digital page according to an embodiment.

FIG. 11C shows a block diagram of the digital page 166. In the illustrated example, the shoulderband 172 includes a battery 176 (e.g., super capacitor that is charged by an electronic spine, not shown) and a power converter 178 to supply power to the digital page 166. Additionally, a secondary wireless power unit 180 may receive power from other sources such as, for example, a tabletop as discussed with regard to the digital pages 144 (FIG. 7). The shoulderband 172 may also include a display driver 182 to control a display portion 184 containing the flexible displays 168, 170. The display driver 182 may also provide sensing and input/output (IO) support. The illustrated shoulderband 172 also includes system memory 186 (e.g., dynamic random access memory/DRAM) and a host processor 188 (e.g., central processing unit/CPU, graphics accelerator). The host processor 188 may format media content and use the system memory 186 to store data and/or commands during operation of the digital page 166. A communication interface 190 (e.g., 10) may facilitate communications between the digital page 166 and the electronic spine and/or other digital pages (not shown). The digital page 166 may also include non-volatile memory 194 (NVM) that is used to store page data associated with the media content, user preferences, etc., as well as volatile data.

The illustrated digital page 166 also includes a content controller 192, wherein the content controller 192 may detect events with respect to the digital page 166 and modify content presented on the flexible displays 168, 170 in response to the events. The events may include, for example, a movement of the digital page 166, user-generated data, etc., wherein the content controller 192 may interpret the events as page flips, data retrieval requests, data transmission requests, and so forth. The content controller 192 may alternatively be incorporated into the host processor 188 (e.g., as configurable logic and/or fixed-functionality logic hardware), the system memory 186, the NVM 194, an operating system (OS) or other application running on the host processor 188 and/or the electronic spine (not shown).

Additionally, light sensors 196 (e.g., on opposing sides of the page) may generate illumination measurement signals, wherein the display driver 182 may deactivate one or more of the flexible displays 168, 170 when the illumination measurement signals indicate that the flexible displays 168, 170 are not being viewed (e.g., in no/low light conditions) in order to conserve power. In this regard, the shoulderband 172 may continue to collect touch input from the flexible displays 168, 170 even while the one or more of the displays 168, 170 are deactivated. For example, if the user is viewing the first flexible display 168 while the second flexible display 170 is deactivated, contact between the fingers of the user and the second flexible display 170 might be used in conjunction with contact between the thumb of the user and the first flexible display 168 to control page turning simulations. For example, small movements and/or pressure of the index finger on the second flexible display (e.g., back page) may cause a different page of content to be presented on the first flexible display 168. The light sensors 196 may optionally be positioned in the display portion 184, depending on the circumstances.

The illustrated digital page 166 also includes a motion sensor 198 to generate motion measurement signals, wherein the display driver 182 sends, in conjunction with the OS, the formatted media content to one or more of the flexible displays 168, 170 further based on the motion measurement signals. For example, the motion measurement signals might indicate that the display portion 184 has been rotated (e.g., turned) so that the second flexible display 170 is face-up and the first flexible display 168 is face-down. In such a case, media content for the next page may be routed to the second flexible display 170 while the first flexible display 168 is deactivated.

The digital page 166 may also include wireless communication interfaces such as, for example, a Bluetooth interface 200 (BT, Bluetooth Core Specification Version 4.0, Jun. 30, 2010, Bluetooth Special Interest Group/SIG) and/or a WiFi interface 202 (Wireless Fidelity, e.g., Institute of Electrical and Electronics Engineers/IEEE 802.11-2007, Wireless Local Area Network/LAN Medium Access Control (MAC) and Physical Layer (PHY) Specifications). The interfaces 200, 202 may facilitate communications with, for example, other digital pages.

The digital page 166 may also include cameras 203 (e.g., on opposing sides of the pages) to capture images of the surroundings. As already noted, the combination of multiple pages together may form a three-dimensional (3D) image capture array with adjustable angles. Accordingly, a large aperture that can be changed by the user may be particularly advantageous for 3D scene generation, object recognition, scanning, etc.

The illustrated flexible extension 174 includes an edge monitor 204 to detect three-dimensional (3D) user input and send the 3D user input to the content controller 192. The 3D user input might include, for example, a squeeze, pull, flick, drag and/or bend of the flexible extension 174. Additionally, one or more sensors 206 may be coupled to the edge monitor 204 and a housing of the flexible extension 174. The sensors 206 may include, for example, strain gauges, piezoelectric transducers, etc., or any combination thereof. The flexible extension 174 may also include a haptic feedback element 208 (e.g., vibrator, unbalanced motor) to simulate, for example, a "ripple" feeling to the user of thumbing through several pages of a book.

As will be discussed in greater detail, the flexible extension 174 may also include one or more light emitting diodes (LEDs) 210 to generate notifications. The notifications may indicate that, for example, a particular page has been reached, data has been sent, data has been received, and so forth. In one example, one or more photodetectors 212 are positioned within the flexible extension 174. In such a case, the LEDs 210 may transmit outbound data (e.g., to other digital pages, not shown) and the photodetectors 212 may receive inbound data (e.g., from other digital pages, not shown). The inbound data and the outbound data may indicate, for example, media content, bookmarks to the media content, handwritten notes on the media content, highlights of the media content, etc., or any combination thereof. Moreover, when a plurality of the LEDs 210 are longitudinally positioned along the flexible extension 174, two or more of the LEDs 210 may output a different color of light to simulate tabs (indicating, e.g., different bookmarks and/or interactive functions).

Figure 12:
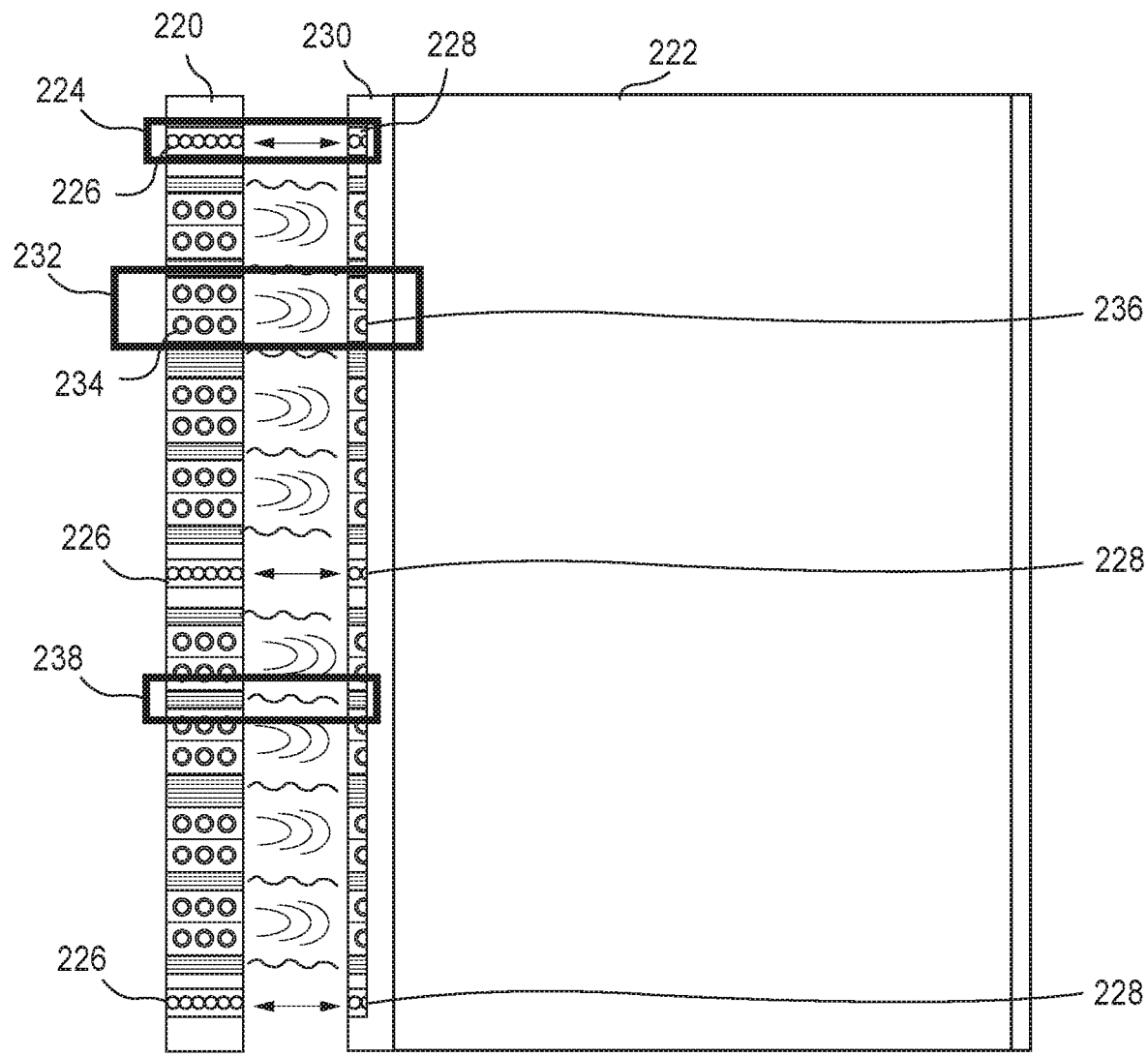
FIG. 12 is an illustration of an example of a magnetic interface, a wireless communication interface and a power delivery interface between an electronic spine and a digital page according to an embodiment.

FIG. 12 shows a set of interfaces between an electronic spine 220 and a digital page 222. More particularly, a magnetic interface 224 may enable the digital page 222 to be removably attached to the electronic spine. The illustrated magnetic interface 224 includes a first plurality of magnetic elements 226 longitudinally positioned adjacent to an external surface of the electronic spine 220 and a second plurality of magnetic elements 228 longitudinally positioned adjacent to a shoulderband 230 of the digital page 222. In the illustrated example, the first plurality of magnetic elements 226 align with the second plurality of magnetic elements 228.

Additionally, a power delivery interface 232 may provide for the wireless (e.g., inductive) charging of the digital page 222. For example, one or more inductive power transmitters 234 may be positioned (e.g., longitudinally) within the electronic spine 220, wherein one or more inductive power receivers 236 may be positioned (e.g., longitudinally) within the shoulderband 230. Moreover, the power transmitters 234 may magnetically align with the power receivers 236 by virtue of the magnetic interface 224.

The illustrated arrangement also includes a wireless communication interface 238, wherein the electronic spine 220 and the digital page 222 exchange data via the wireless communication interface 238. More particularly, the wireless communication interface 238 may include capacitive coupling components, electromagnetic coupling components, optical coupling components (e.g., LEDs and photodetectors), infrared (IR) coupling components, short-range wireless components (e.g., BT, WiFi), etc., or any combination thereof. In this regard, the data may be exchanged bi-directionally. Moreover, the data might include user-generated data transferred from the digital page 222 to the electronic spine 220, wherein the user-generated data indicates bookmarks, handwritten notes, highlights, and so forth. Of particular note is that if the interface regions are symmetric, the digital page 222 may mounted upside down without errors occurring (e.g., fully symmetric orientation).

Figure 13:
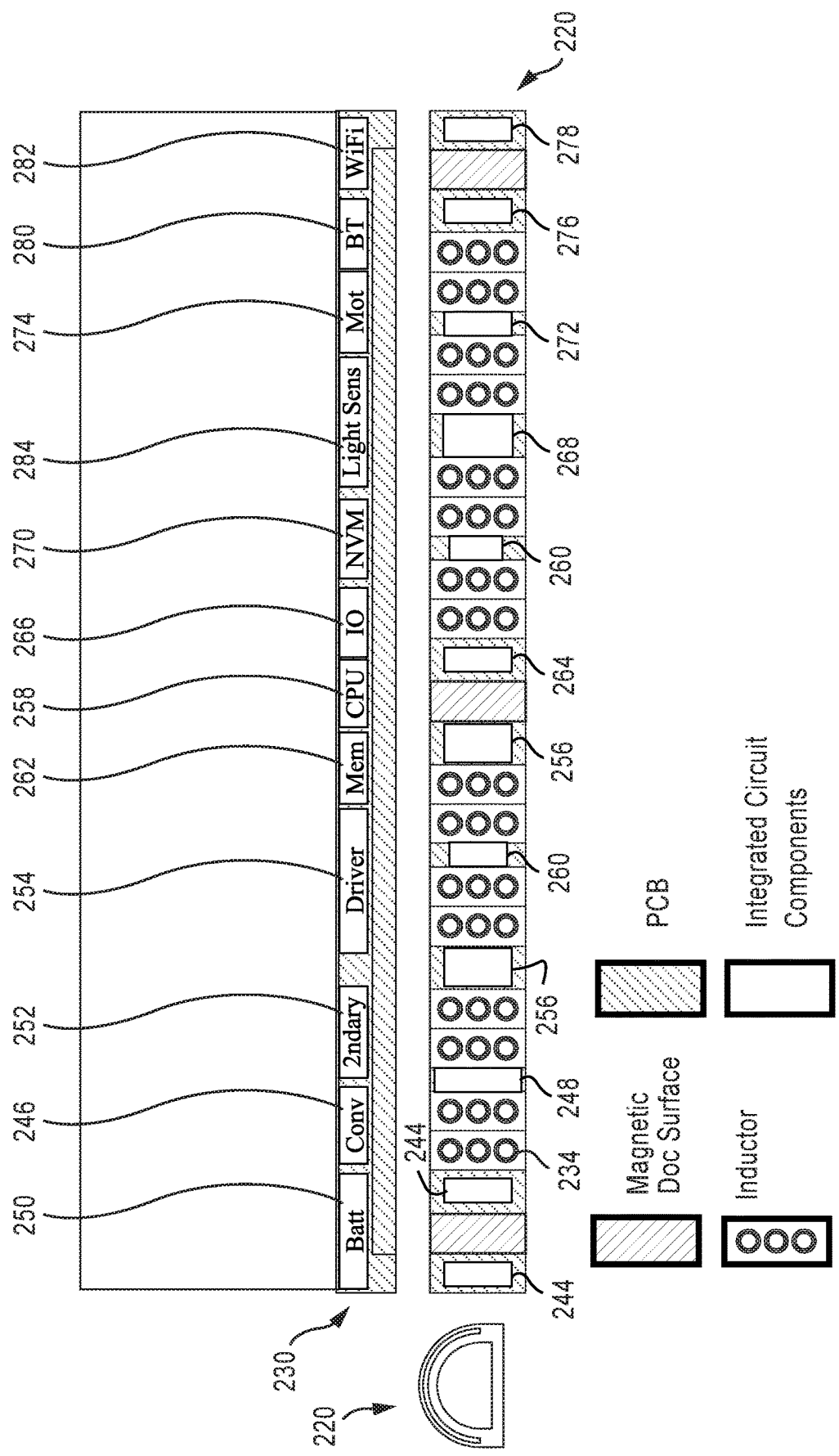
FIG. 13 is an enlarged illustration of an example of a digital page shoulderband and an electronic spine according to an embodiment.

FIG. 13 shows an enlargement of the electronic spine 220 (see also, FIG. 12) relative to the shoulderband 230, which may be similar to the shoulderband 172 (FIG. 11C), already discussed. In the illustrated example, power conversion circuit components 244 coordinate with a power converter 246 in the shoulderband 230 to supply power to the digital page. As already noted, the shoulderband 230 may include a battery 250 and a secondary wireless power unit 252. Additionally, display driver circuitry 248 in the electronic spine 220 may coordinate with, or be substituted for, a display driver 254 in the shoulderband 230 to control the flexible displays of the digital page. The illustrated electronic spine 220, which has a half cylinder shape, also includes processor circuitry 256 to coordinate with, or be substituted for, a host processor 258 (e.g., CPU, graphics accelerator) in order to format media content and/or perform the operations of a content controller such as, for example, the content controller 192 (FIG. 11C). The processor circuitry 256 may use system memory 260 in conjunction with the use of system memory 262 by the host processor 258 in the shoulderband 230. The electronic spine 220 may also include IO circuitry 264, which coordinates with a communication interface 266 (e.g., 10) in the shoulderband 230 during the exchange of data between the electronic spine 220 and the shoulderband 230.

In one example, the electronic spine 220 further includes NVM circuitry 268 that is used, along with an NVM 270 in the shoulderband 230, to store page data associated with the media content, user preferences, volatile data, and so forth. Moreover, the electronic spine 220 may include motion sensor circuitry 272 that coordinates with a motion sensor 274 in the handling of motion measurement signals. Wireless communication circuitry such as, for example, BT circuitry 276 and WiFi circuitry 278, may coordinate with, or be substituted for, a BT interface 280 or a WiFi interface 282, respectively, in the shoulderband 230. The shoulderband 230 may also include a light sensor 284 that generates illumination measurement signals, wherein the display driver 254 and/or the display driver circuitry 248 may selectively deactivate flexible displays when the illumination measurement signals indicate that the flexible displays are not being viewed.

Figure 14:
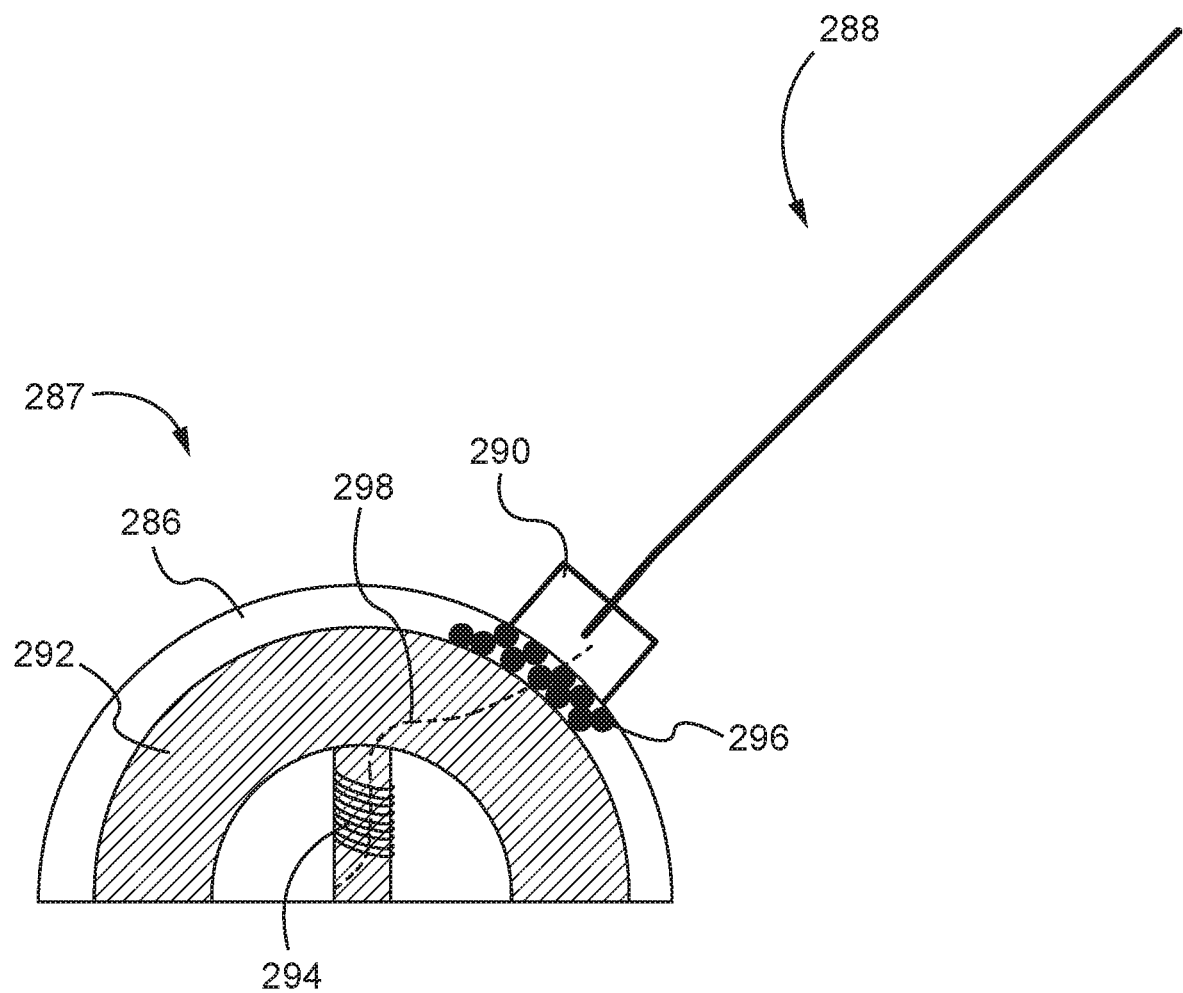
FIG. 14 is a sectional view of an example of an integrated magnetic and power delivery interface according to an embodiment.

Turning now to FIG. 14, a sectional view of an integrated magnetic and power delivery interface between an electronic spine 287 and a digital page 288 is shown. In the illustrated example, the electronic spine 287 includes a magnetic core material 292, a primary coil/winding 294 and a plurality of metal beads 296 positioned between the magnetic core material 292 and a housing 286 of the electronic spine 287. Additionally, a shoulderband 290 of the digital page 288 may include a magnet and coil (not shown), wherein driving current through the primary winding 294 generates an inductive charging path 298 while an attractive magnetic force pulls the electronic spine 287 and the shoulderband 290 into contact with one another. The digital page 280 may therefore slide around the perimeter of the electronic spine 287 while maintaining the inductive charging path 298.

Figure 15A:
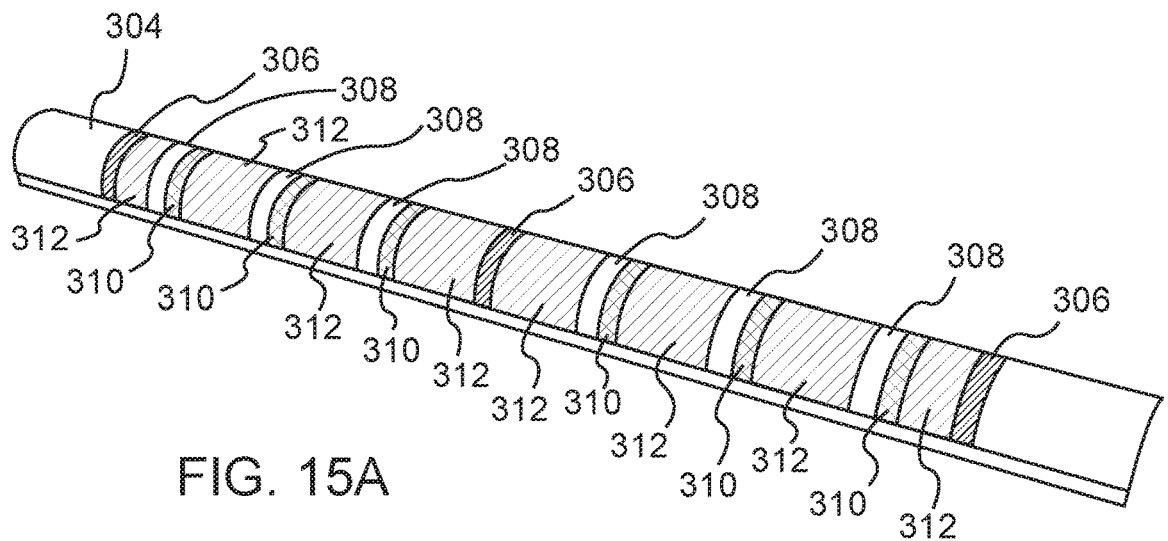
FIG. 15A is a perspective view of an example of an electronic spine having longitudinally spaced magnetic, communication and power delivery segments according to an embodiment.
Figure 15B:
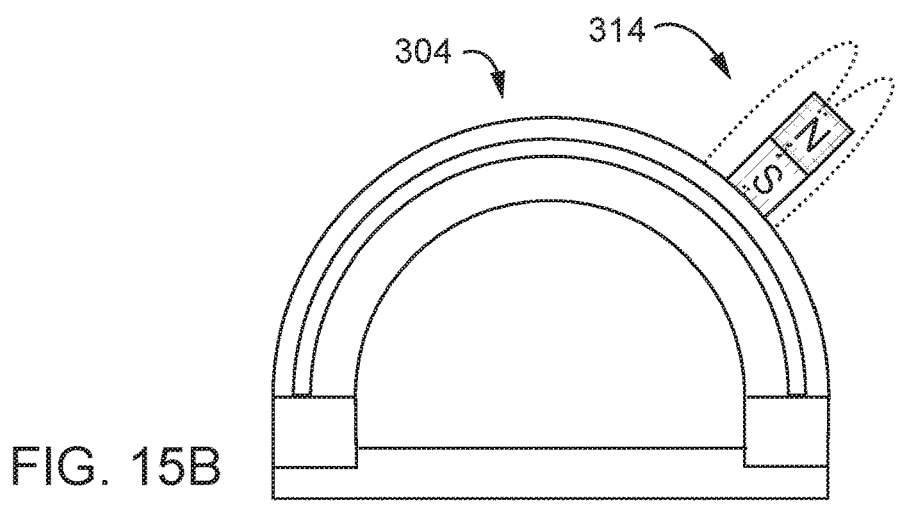
FIG. 15B is an end view of an example of a magnetic segment coupled to a magnetized shoulderband according to an embodiment.
Figure 15C:
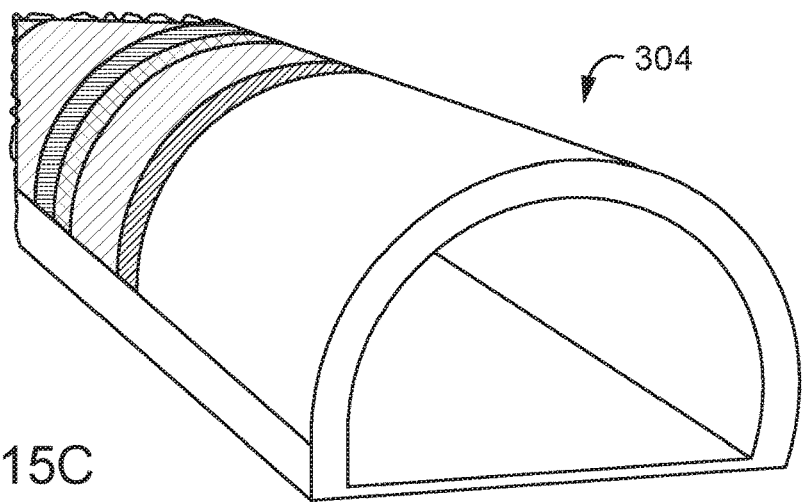
FIG. 15C is an end perspective view of an example of the electronic spine illustrated in FIG. 16 according to an embodiment.

FIG. 15A shows a perspective view of an electronic spine 304 having longitudinally spaced magnetic elements 306 (e.g., metallic inlays), receive communication elements 308, transmit communication elements 310 and power delivery elements 312. The shoulderband (not shown) may have corresponding elements that are longitudinally spaced to align with the elements 306, 308, 310, 312 of the electronic spine 304. FIG. 15B demonstrates that a shoulderband 314 may be provided with a magnetized configuration to facilitate removable attachment to the electronic spine 304. Additionally, FIG. 15C demonstrates that the electronic spine 304 may include surfaces defining one or more cavities to house the various electronic components of the spine 304.

Figure 16:
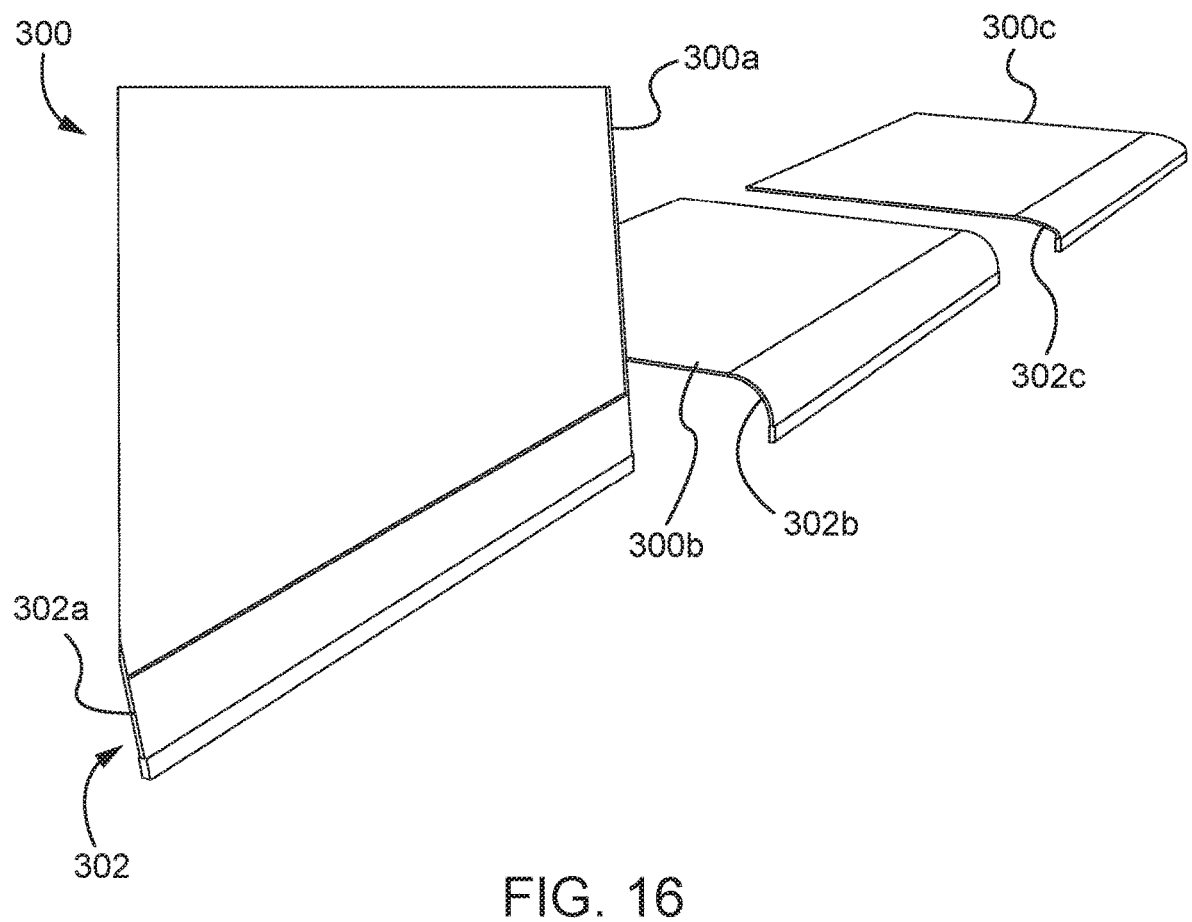
FIG. 16 is a perspective view of an example of a plurality of digital pages having elastic headbands according to an embodiment.

FIG. 16 shows a plurality of digital pages 300 (300a-300c) that may be used with a socketed electronic spine such as, for example, the electronic spine 108 (FIGS. 2A and 2B), already discussed. In the illustrated example, the digital pages 300 include elastic headbands 302 (302a-302c). The elastic headbands 302 may increase flexibility in order to more closely approximate the page-turn experience from the perspective of the user.

Figure 17A:
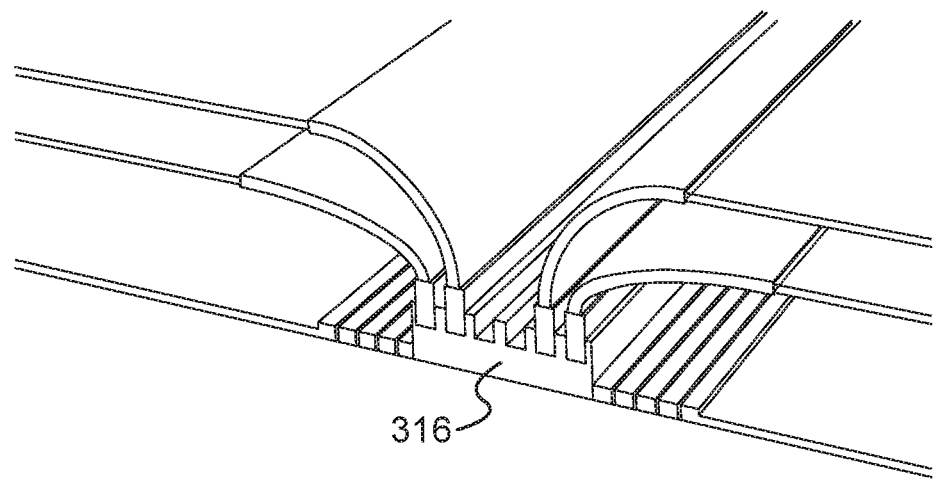
FIGS. 17A and 17B are enlarged perspective views of examples of electronic spines with surfaces defining a plurality of sockets according to embodiments.
Figure 17B:
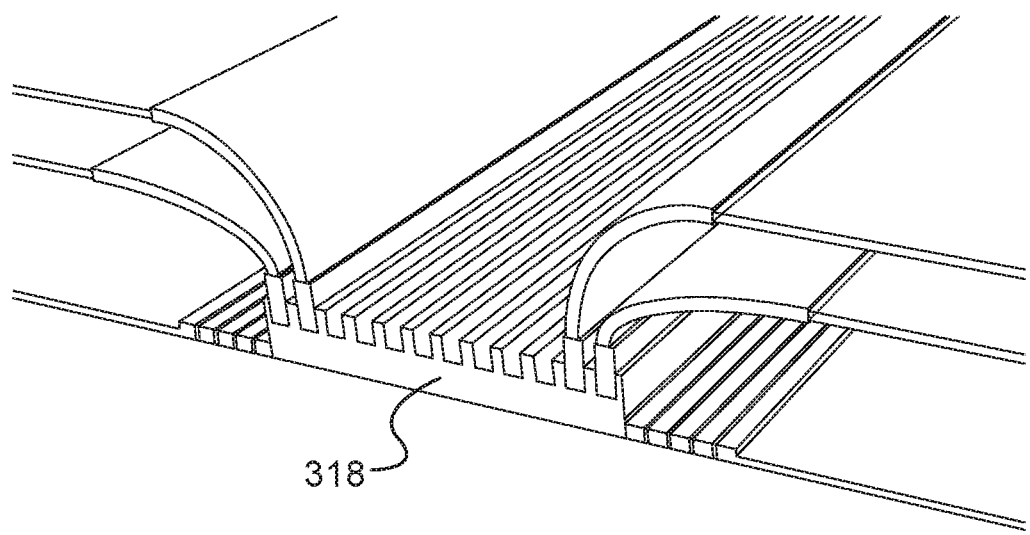

Turning now to FIGS. 17A and 17B socketed electronic spines 316 and 318 are shown, respectively. The electronic spine 316 contains five sockets, whereas the electronic spine 318 contains twelve sockets. Accordingly, the number of sockets (e.g., socket count) may vary depending on the circumstances and expected usage scenario. In either example, the number of printed media pages (e.g., printed page count) presented on the digital pages may be substantially greater than the number of sockets (e.g., limited only by storage, transmission or compute resources). Moreover, the number of digital pages (e.g., digital page count) is less than or equal to the socket count in the illustrated example.

Figure 18A:
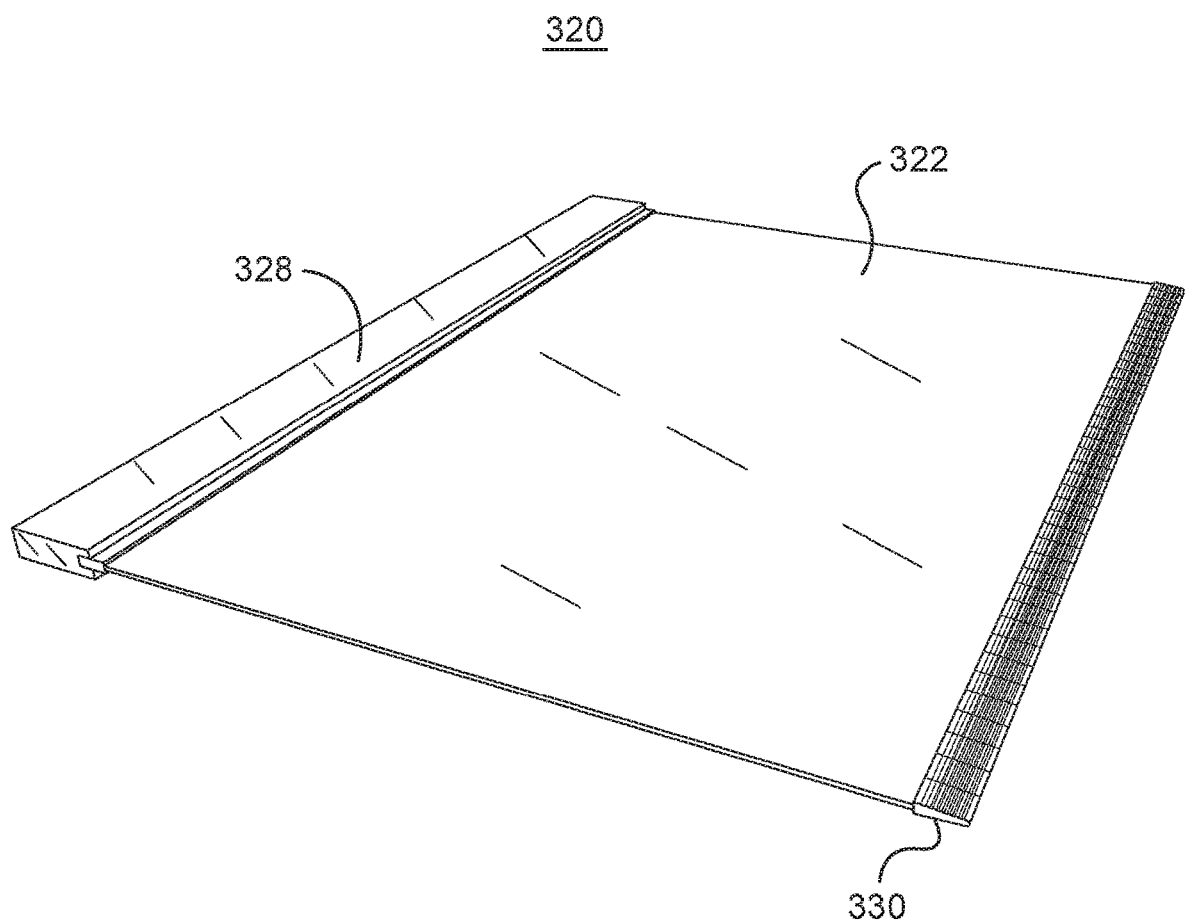
FIGS. 18A-18C are perspective, plan and side views of an example of a mobile system having an electronic spine that is substantially formed in a rectangular prism shape according to an embodiment.
Figure 18B:
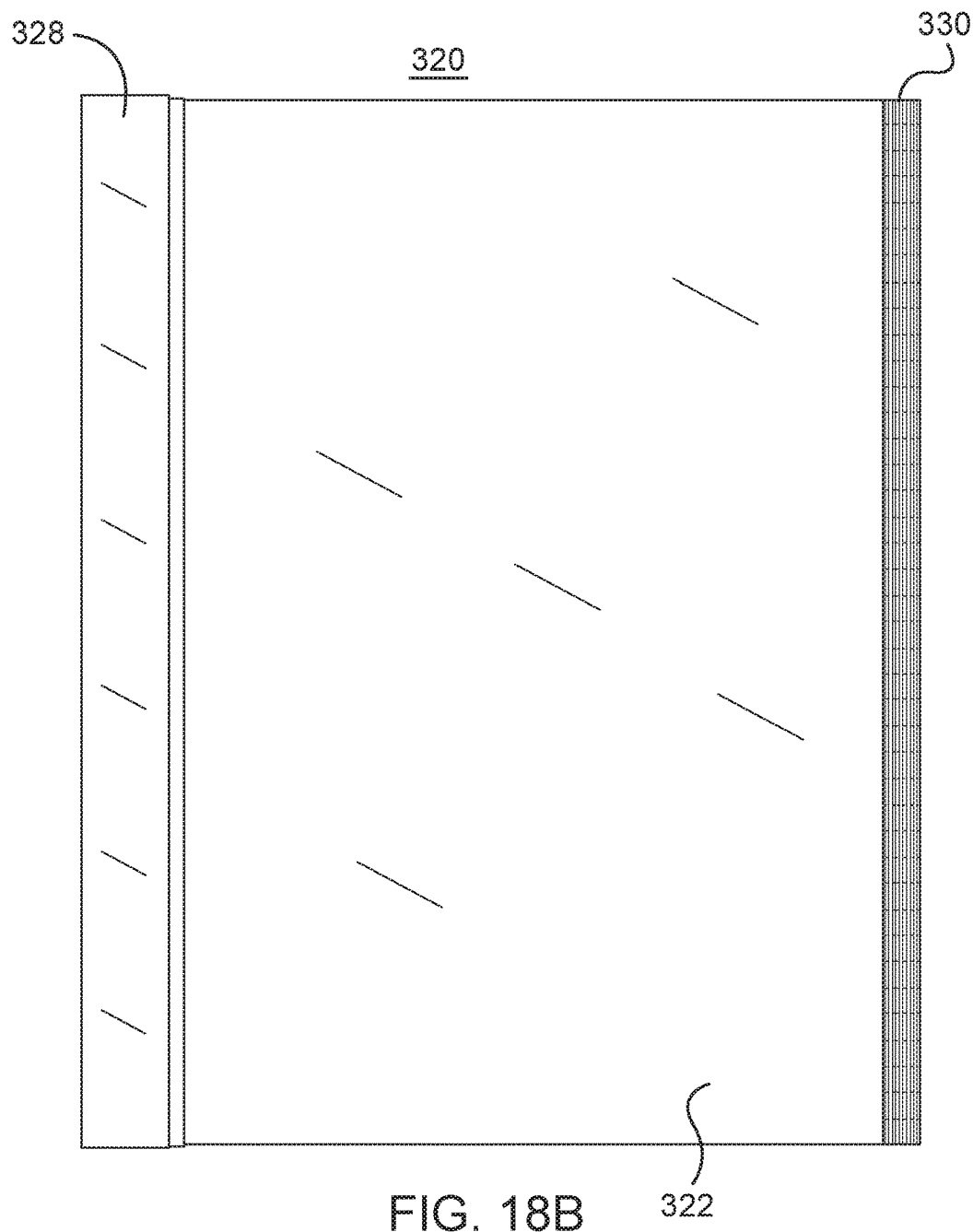
Figure 18C:
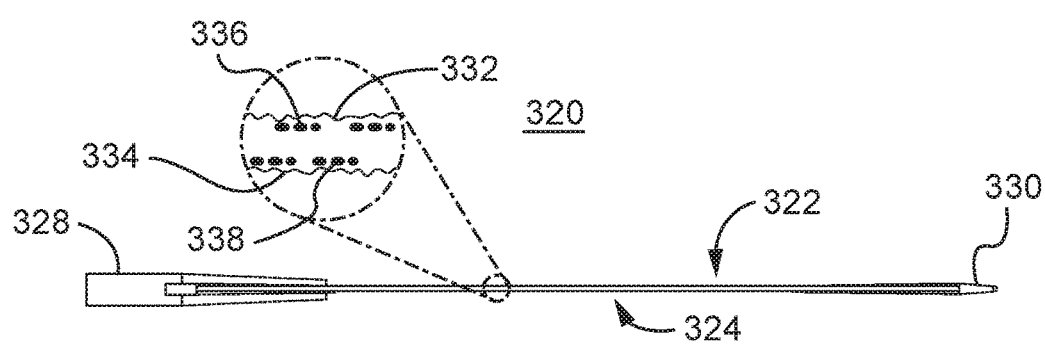

FIGS. 18A-18C show an interactive mobile system 320 that includes an electronic spine 328, wherein the electronic spine 328 is substantially formed in a rectangular prism shape. The illustrated mobile system 320 also includes a digital page having first side with a first flexible display 322, a second side with a second flexible display 324 and a flexible extension 330 coupled to an outer edge of the display portion of the digital page. The electronic spine 328 may therefore be considered a "compute spine stick" to the extent that the electronic spine 328 provides processing support to the digital page. As best seen in FIG. 18C, the first flexible display 322 may include a first textured touch surface 332 and the second flexible display 324 may include a second textured touch surface 334. Texturing (e.g., scoring) the surfaces 332, 334 may enable the flexible displays 322, 324 to emulate the touch and feel of printed media (e.g., paper, canvas). Additionally, a first array of strain gauges 336 may be coupled to the first touch surface 332 and a second array of strain gauges 338 may be coupled to the second touch surface 334. In such a case, the strain gauges 336, 338 may generate measurement signals to quantify contact between the flexible displays 322, 324 and a writing implement such as, for example, a stylus, electronic pen, electronic highlighter and/or the bristles/hairs of an electronic brush. Indeed, data fusion of capacitive and pressure sensor measurements may enable improved suppression of noise resulting from, for example, the hand of a user touching the display surface while writing a note.

Figure 19:
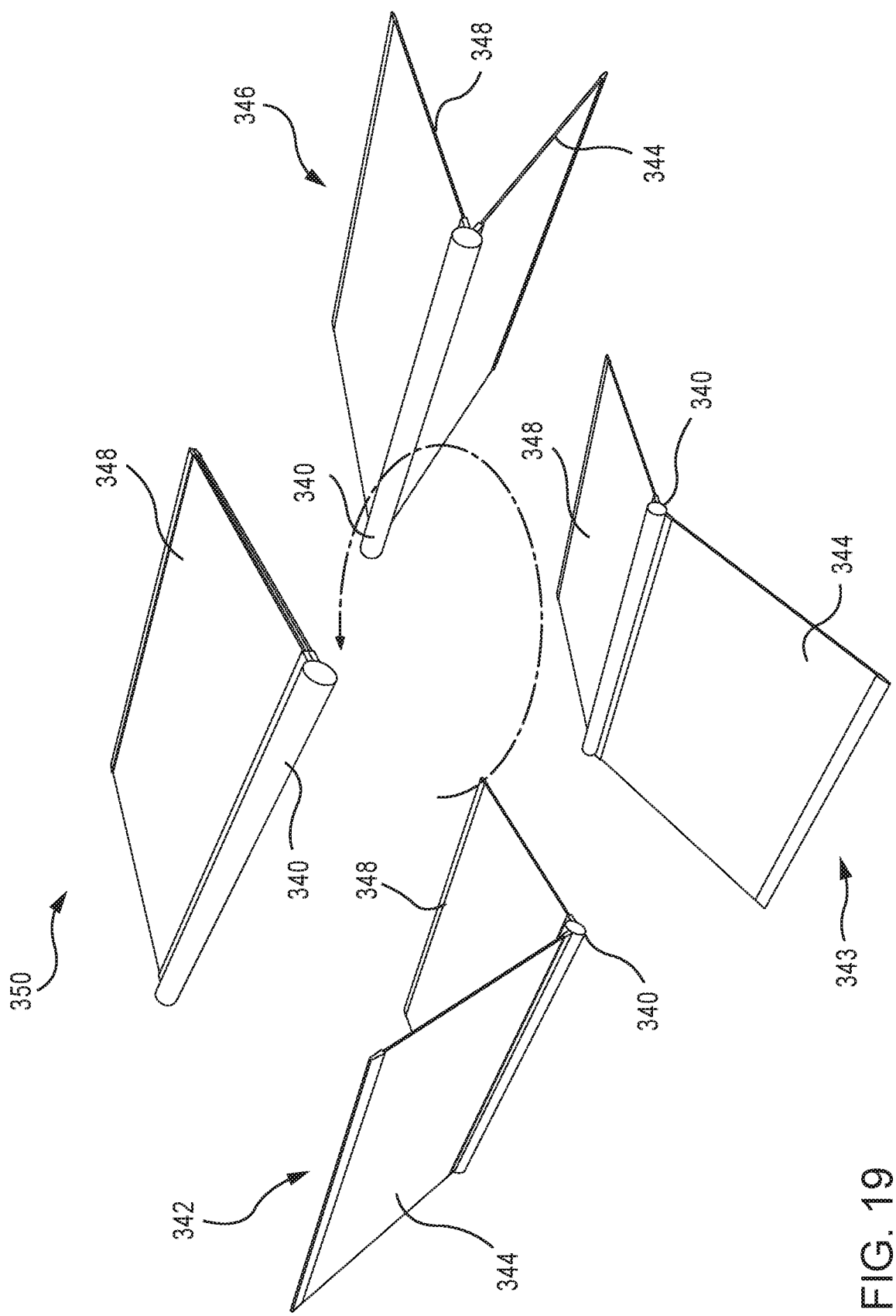
FIG. 19 is an illustration of an example of a page turning sequence for a mobile system having an electronic spine with a substantially smooth exterior surface and a cylinder shape according to an embodiment.

FIG. 19 shows an infinity page turn sequence for a mobile system having an electronic spine 340 with a substantially smooth exterior surface and a cylinder shape. In a first state 342, the mobile system is in a notebook form factor. In a second state 343, a user (not shown) begins rotation of a first digital page 344 around the electronic spine 340. In a third state 346, the first digital page 344 is rotated behind a second digital page 348. In a fourth state 350, the first digital page 344 is completely behind the second digital page 348. Accordingly, media content may be sequentially presented on the front and back sides of the displays 344, 348 in a substantially endless fashion.

Figure 20A:
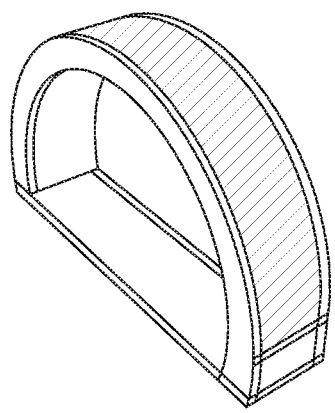
FIG. 20A is a perspective and end view of examples of various magnetic segments according to embodiments.
Figure 20A:
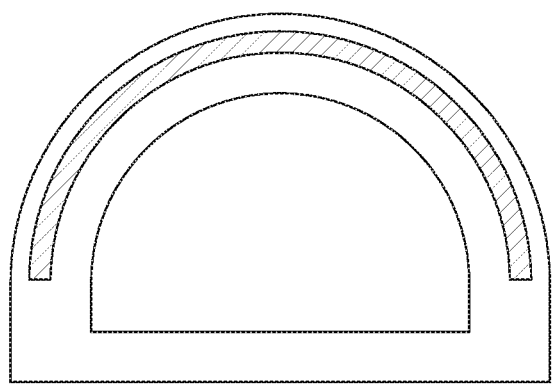
Figure 20B:
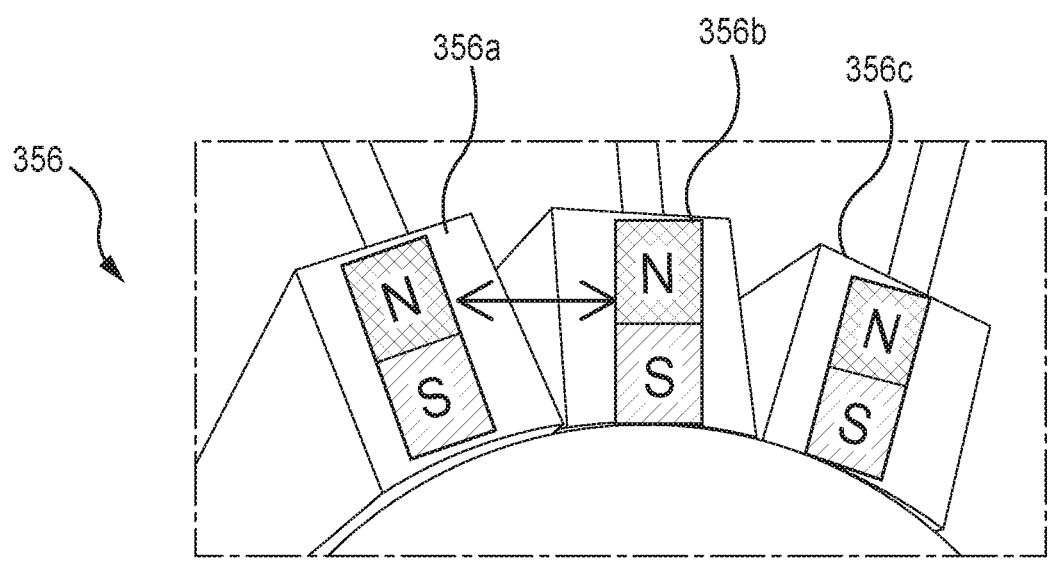
FIG. 20B is an enlarged illustration of an example of a plurality of adjacent digital pages according to an embodiment.

FIG. 20A shows perspective and end views of a magnetic segment 352 with a metallic inlay formed around the perimeter and a magnetic segment 354 with a metallic insert positioned adjacent to the perimeter, respectively. The segments 352, 354 may be used in electronic spines to achieve a removable attachment with a digital page. FIG. 20B shows an enlarged view of a plurality of adjacent shoulderbands 356 (356a-356c). The shoulderbands 356 have a polarity (e.g., permanent magnetization) that prevents the shoulderbands 356 from being attracted to one another. FIG. 20C shows the magnetic segment 354 in different attachment states. In a first state 358, the magnetic segment 358 is not attached to any shoulderbands. In a second state 360, the magnetic segment 358 is attached to a single shoulderband 362. In a third state 364, the magnetic segment 358 is attached to multiple shoulderbands 362. FIGS. 20D and 20E demonstrate the range of motion of a half cylinder shaped magnetic segment 354 in comparison to a cylinder shaped magnetic segment 366.

Turning now to FIG. 21A, another magnetic segment 368 is shown in different attachment states. The illustrated magnetic segment 368 includes a fluid 370 (e.g., lubricant) and a metallic agent 372 (e.g., bearings) floating in the fluid 370. In a first state 374, the magnetic segment 368 is not attached to any shoulderbands. In a second state 376, the magnetic segment 368 is attached to a single shoulderband 362, wherein the metallic agent 372 conforms to the magnetic field and provides an attachment point to the single shoulderband 362. In a third state 378, the magnetic segment 368 is attached to multiple shoulderbands 362. In the illustrated example, the metallic agent 372 conforms to multiple magnetic fields and forms multiple attachment points to the shoulderbands 362. The fluid 370 may reduce audible noise and mechanical resistance during movement of the shoulderbands 362 around the perimeter of the magnetic segment 368. FIG. 21B shows a cutaway perspective view of the magnetic segment 368 and FIG. 21C shows an end view of a cylindrical magnetic segment 380 having a fluid 382 and a metallic agent 384 floating in the fluid.

Flexible Extension

Figure 22:
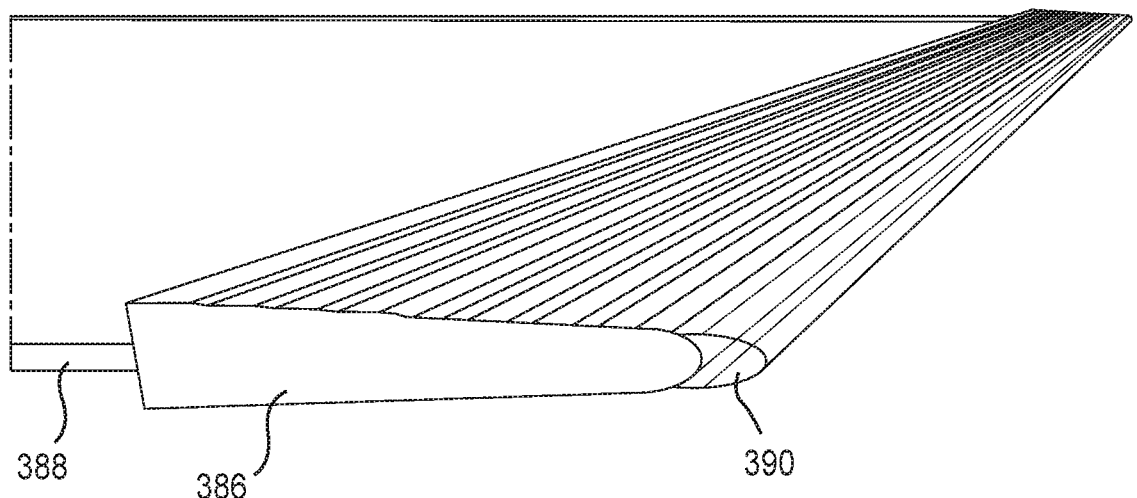
FIG. 22 is a perspective view of an example of an edge extension having a light emitting diode (LED) strip according to an embodiment.

FIG. 22 shows a flexible extension 386 coupled to an outer edge of an electronic subsystem 388 such as, for example, a digital page. The electronic subsystem 388 may include other display-based devices such as, for example, eBook (electronic book) readers, tablet computers, smart phones, and so forth. The illustrated extension 386 generally includes a textured exterior surface and an outer profile that is substantially formed in a triangular prism shape (e.g., triangular cross-section). Accordingly, the extension 386 may be readily grasped and manipulated by a user of the electronic subsystem 388. In this regard, the flexible extension 386 may include an edge monitor such as, for example, the edge monitor 204 (FIG. 11C) that is configured to detect 3D user input and send the 3D user input to a content controller such as, for example, the content controller 192 (FIG. 11C).

Moreover, the flexible extension 386 may also include one or more sensors such as, for example, the sensors 206 (FIG. 11C) coupled to the edge monitor and the housing of the flexible extension 386, wherein the sensor(s) include strain gauges, piezoelectric transducers, etc., or any combination thereof. Accordingly, the 3D user input might include, for example, a squeeze of the flexible extension 386, a pull of the flexible extension 386, a flick of the flexible extension 386, a drag of the flexible extension 386, a bend of the flexible extension 386, and so forth. The flexible extension 386 may also include a haptic feedback element such as, for example, the haptic feedback element 208 (FIG. 11C).

In one example, the flexible extension 386 further includes a strip of LEDs 390 longitudinally positioned along the flexible extension 386. Although the LEDs 390 may be used to generate notifications (indicating that, e.g., a particular page has been reached, data has been sent, data has been received, etc.), the LEDs 390 may also be used to perform more complex operations. For example, if one or more photodetectors such as, for example, the photodetectors 212 (FIG. 11C), are also positioned within the flexible extension 386, the flexible extension 386 may support bi-directional communications. More particularly, the LEDs 390 might transmit outbound data (e.g., to other electronic subsystems) and the photodetectors may receive inbound data (e.g., from other electronic subsystems). The inbound data and the outbound data may indicate media content, a bookmark to the media content, a handwritten note on the media content, a highlight of the media content, and so forth. Any suitable modulation scheme may be used to optically transmit and receive the data.

Figure 23:
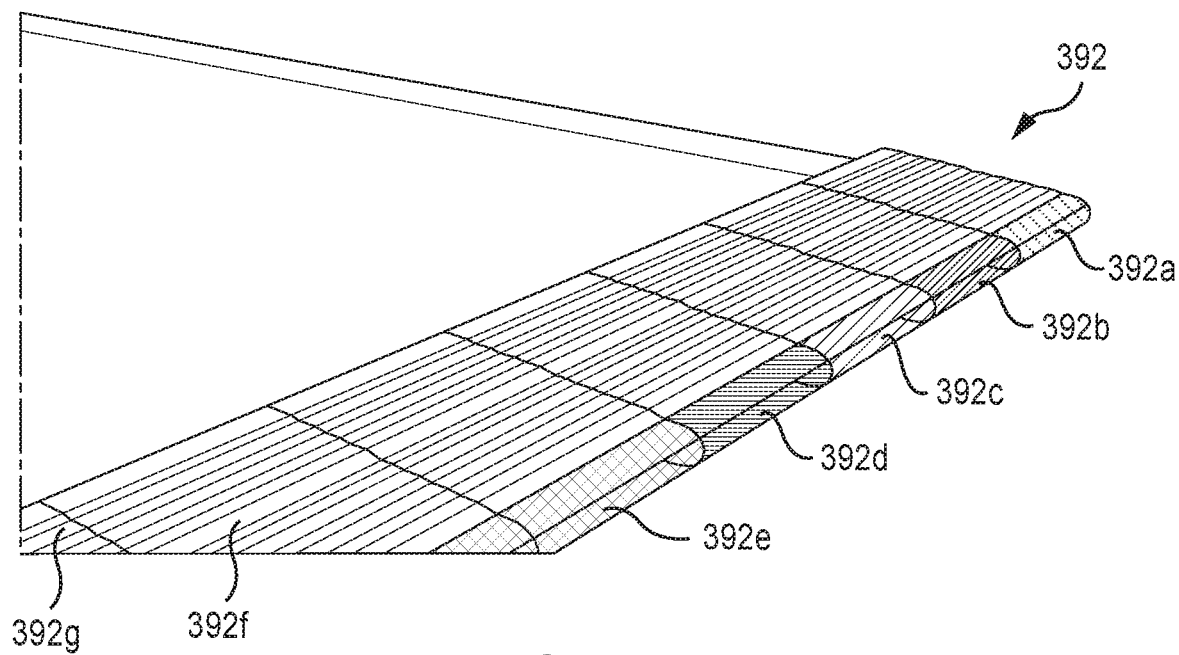
FIG. 23 is a perspective view of an example of an LED strip that outputs different colors of light according to an embodiment.

FIG. 23 demonstrates that a flexible extension 392 (392a-392g) may be partitioned into multiple segments, wherein LEDs in different segments may output different colors of light. For example, a first segment 392a may output magenta light, a second segment 392b may output yellow light, a third segment 392c may output green light, a fourth segment 392d may output blue light, and so forth. Such an approach may enable additional information to be conveyed to the user. For example, each color might represent a tab/bookmark of a particular page in a book. In another example, the different colors may correspond to different interactive functions that might be triggered by the user. Thus, bending the magenta first segment 392a may cause the electronic subsystem 388 to transmit data from the current page to another electronic subsystem (not shown). Bending the yellow second segment 392b, on the other hand, may cause the electronic subsystem 388 to request media content from another electronic subsystem. The flexible extension 392 and/or the flexible extension 386 (FIG. 22) may be combined with other solutions described herein such as, for example, the digital page, electronic spine and/or power delivery solutions, to achieve significant synergistic results in a wide variety of settings.

Power Delivery

Figure 24A:
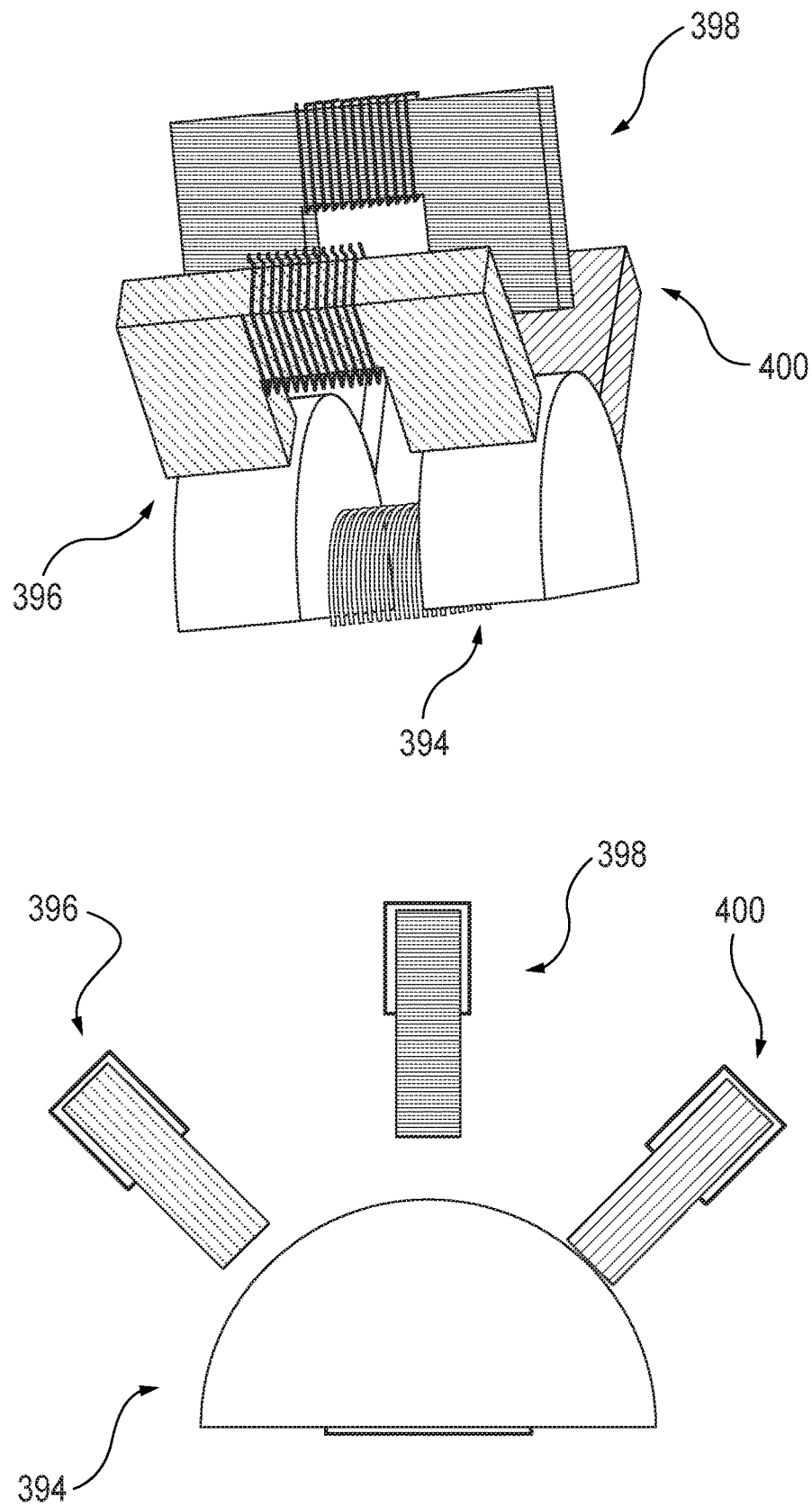
FIG. 24A is a perspective and end view of an example of a plurality of power delivery interfaces prior to attachment according to an embodiment.
Figure 24B:
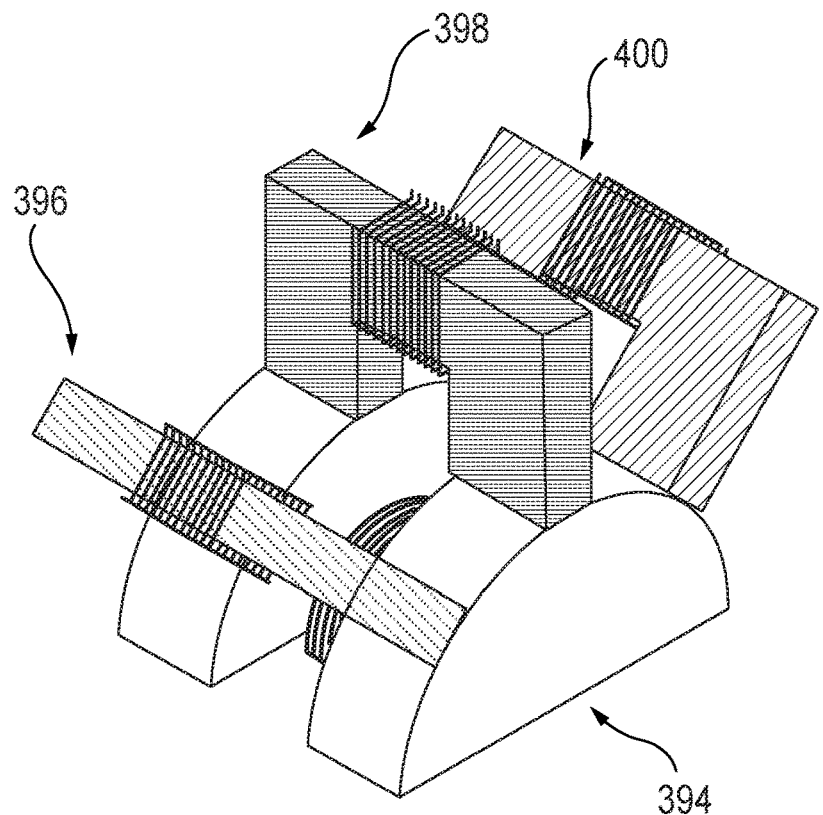
FIG. 24B is a perspective and end view of an example of a plurality of delivery interfaces after attachment according to an embodiment.
Figure 24B:
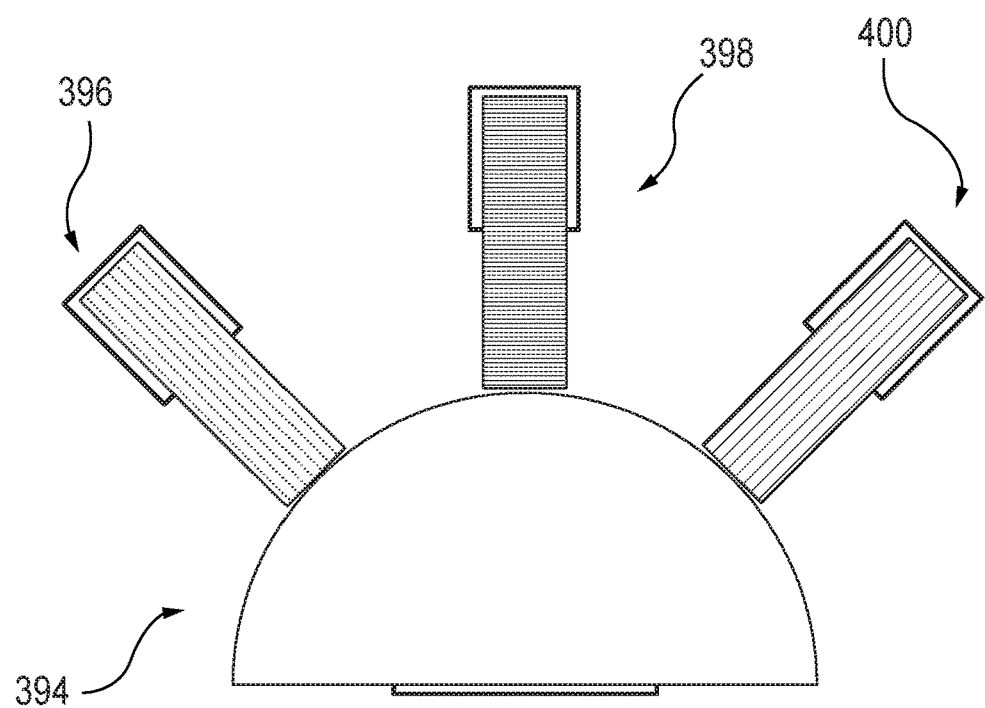

FIG. 24A shows three power delivery interfaces prior to attachment of two of the interfaces. More particularly, an inductive power transmitter 394 may be positioned within a first component (not shown) such as an electronic spine. Additionally, a first inductive power receiver 396 is detached from the inductive power transmitter 394, a second inductive power receiver 398 is detached from the inductive power transmitter 394 and a third inductive power receiver 400 is attached to the inductive power transmitter 394. The power transmitter 394 may include a half-cylinder bobbin core with a primary coil and the power receivers 396, 398, 400 may include U-shaped secondary cores and corresponding secondary windings. As each power receiver 396, 398, 400 comes within proximity of the power transmitter 394, as shown in FIG. 24B, current flowing in the primary coil may induce a charge current in the secondary coils. Thus, the power receivers 396, 398, 400 may be positioned within second components such as, for example, digital pages, in order to charge the second components.

Figure 25:
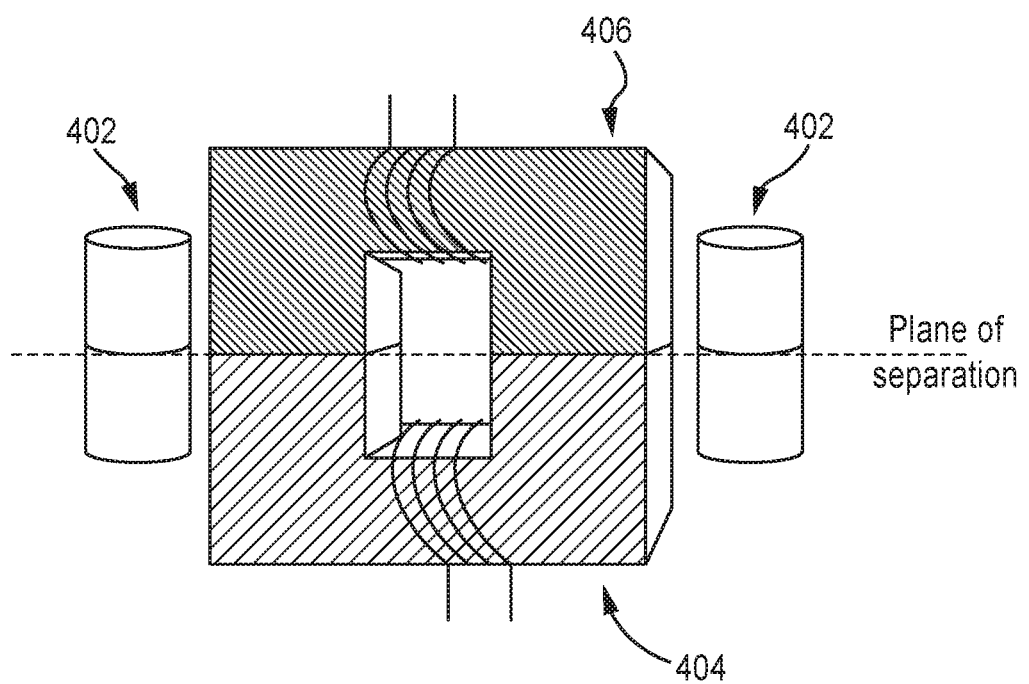
FIG. 25 is an illustration of an example of a separated magnetic interface and power delivery interface according to an embodiment.

FIG. 25 demonstrates that one or more magnet sets 402 (e.g., neodymium permanent magnets) may ensure alignment between the core of an inductive power transmitter 404 and the core of an inductive power receiver 406. Magnetic alignment may optimize performance and/or charging efficiency. In the illustrated example, the magnet sets 402 are adjacent to the cores being aligned.

Figure 26:
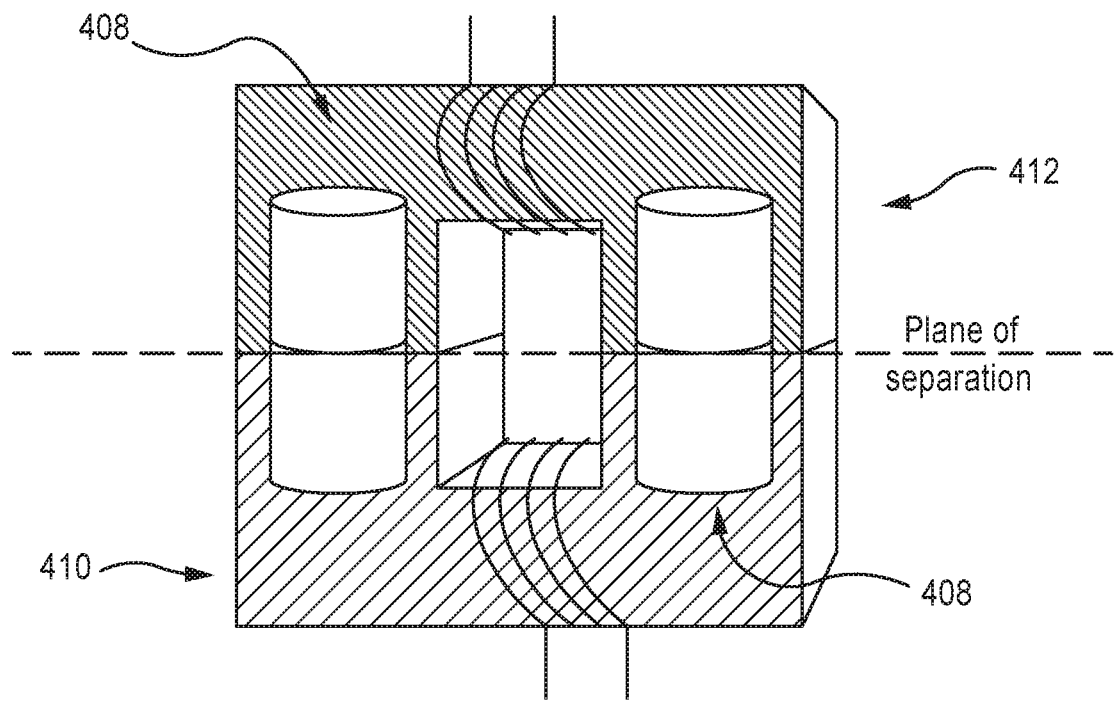
FIG. 26 is an illustration of an example of an integrated magnetic interface and power delivery interface according to an embodiment.

FIG. 26 demonstrates that one or more magnet sets 408 may be incorporated into the cores of an inductive power transmitter 410 and an inductive power receiver 412. Again, magnetic alignment provided by the magnet sets 408 optimizes performance and/or charging efficiency, in the illustrated example.

Figure 27:
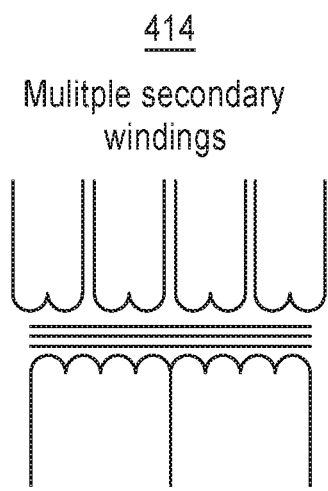
FIG. 27 is a schematic diagram of an example of a winding configuration of a power delivery interface according to an embodiment.

Turning now to FIG. 27, a winding configuration 414 is shown. In the illustrated example, multiple secondary windings are inductively coupled with multiple primary windings. Some of the secondary windings may be used to couple and align the inductors for power delivery, while other secondary windings may be used to exchange data.

Figure 28:
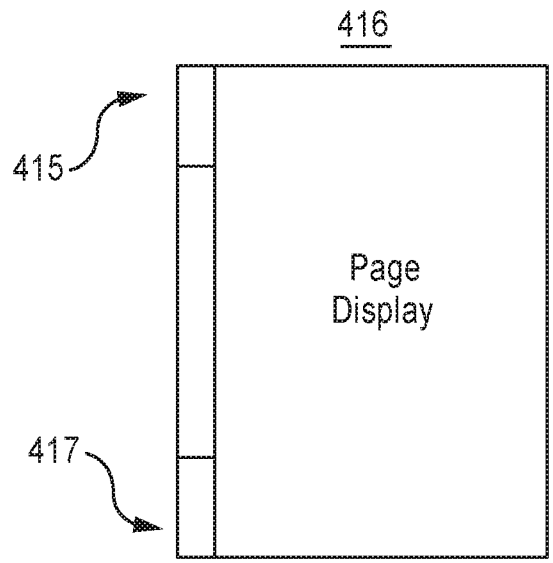
FIG. 28 is a plan view of an example of a magnet and coil configuration in a digital page according to an embodiment.

FIG. 28 shows a magnet and coil configuration in a digital page 416. In the illustrated example, a first region 415 includes a magnet and coil and a second region 417 also includes a magnet and coil. Accordingly, both power delivery and data transmission may be duplicated in order to achieve redundancy. Depending on power delivery requirements, the wireless power delivery elements may be provisioned accordingly along the electronic spine (not shown).

FIG. 29 demonstrates that the inductive power receiver may include a patterned three-layer inductor 418. More particularly, a magnetic laminate 420 (e.g., planar inductor material) may be "sandwiched" between wires 422 that are interconnected by vias 424. In the illustrated example, materials with high magnetic properties (e.g., relative magnetic permeability, $\mu_r$) may be used to form the inductor core in order to compensate for the relative thinness of the inductor 418. Examples of such materials include, but are not limited to, mu-metal, permalloy and/or supermalloy.

For example, while the magnet may be used as part of a series connected magnetic circuit, neodymium rare earth permanent magnets have a very low relative permeability $\mu_r=1.05$, which is nearly identical to air. It is common for an inductor or transformer core to have a relative permittivity $\mu_r=1000$, so a series magnet essentially presents the equivalent of a low-reluctance "air gap" in the magnetic circuit that would reduce the coupling of the primary and secondary cores. While the inductive cores forming the inductive power receiver may be physically small, core materials with $\mu_r=50,000$ may enable designs with these smaller dimensions. Thus, with a switching frequency of, for example, 80 KHz, a transformer self-inductance of 10 to 400 µH may present an inductive reactance of 5 to 200Ω, which could drop significantly with the presence of one or more attached digital pages.

Turning now to FIG. 30, an integrated communication and power delivery interface 426 is shown. In the illustrated example, a first component 428 (e.g., electronic spine) includes a rechargeable battery 430, a first interface manager 432 and a direct current (DC) to alternating current (AC) converter 434 coupled to the rechargeable battery 430 and the first interface manager 432. Additionally, one or more inductive power transmitters may include a separable transformer core 436 and one or more windings 438 coupled to the DC to AC converter 434.

Additionally, a second component 440 (e.g., digital page) may include a second interface manager 442 and an AC to DC converter 444 coupled to the second interface manager 442 and one or more windings 446 of an inductive power receiver having a separable transformer core 448. The second component 440 may also include a charge storage component 450 (e.g., super capacitor) coupled to the AC to DC converter 444, wherein the charge storage component 450 powers a load of the second component 440.

The first interface manager 432 may generally maintain battery life in the second component 440 and ensure efficient power transfer. In this regard, the second interface manager 442 may signal the power demand of the second component 440 to the first interface manager 432, which may use that information to prioritize power delivery among multiple second components 440 (e.g., multiple digital pages). The illustrated first component 428 also includes a connection controller 452 that determines whether the second component 440 is attached to the first component 428. The connection controller 452 may include, for example, a Hall sensor, a Reed switch, etc. The first interface manager 432 may use information from the connection controller 452 to further prioritize power delivery.

FIG. 31 shows a method 454 of operating a mobile system. The method 454 may generally be implemented in a content controller such as, for example, the content controller 192 (FIG. 11C), already discussed. More particularly, the method 454 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 456 provides for detecting an event with respect to a digital page. The event may include, for example, a movement of the digital page, user-generated data, etc., or any combination thereof, wherein block 456 may include interpreting the event as a page flip, a data retrieval request, a data transmission request, and so forth. Block 458 may modify content presented on a first and/or second flexible display of the digital page in response to the event.

Usage Models

Reading & Taking Notes: The user is reading a text (text book, projection from e.g. the classroom teacher, etc.) and wants to take notes. There are various ways to get an "empty" page. Removing a page from behind the current page may generate by default an empty page. As the user takes notes on the detached page, the pages shown in the mobile system are saved, enabling the user to virtually add the notes as annotations to the text or move text passages from the mobile system to the detached page (e.g., swipe action). The user may also directly annotate and highlight in the text itself, mark areas with smart references and/or write/draw down more detail on the detached pages. Flipping the detached page to the left may enable the user to continue taking notes. Flipping the detached page to the right transitions to the previous content. Audio/video recordings may also be an option. As the detached page is reattached to the spine, the notes appear next to the shown page. If there are multiple page notes, the notes may now be displayed across several pages. If the notes contain references to various pages, the notes may be shown across the book. There may be various display modes such as showing notes along with text or showing notes as a coherent document with access to the book. While studying, the notes become the main document (e.g., with the textbook being a reference). The written text may be converted into machine readable code and indexed (e.g., via audio cues).

Reading and Pinning a Page: The user is reading a text and wants to keep one page (e.g., with a graph), next to the main book for reference. With a pinch (e.g., on the top right of the flexible extension) or a gesture removing the magnetic attach points north to south, the user is "ripping out" the page. Once detached, the user still has the ability to flip through the ripped out page. This approach is virtually spanning the book over two devices. With another gesture on the flexible extension, this page can be erased and used for notes. Following the usage model of a "ripped out" page, the user may want to put the page back into the mobile system.

Inserting the detached page behind the current active page in the mobile system may simply assimilate the page back. Inserting the page on top may make the detached page the active reference. The page to the left may be updated to display the content that would come before the ripped out/detached page. With the flexible extension, a side-by-side comparison may be initiated. This approach might be beneficial when manipulating content by moving graphical information across pages.

Collaborative Data Review: The user may be able to review data (e.g., in a medical report) with a patient, wherein the order of the documents is fixed. The doctor marks an area on the X-ray image shown on a page. The doctor may review the page in two ways: Clone the page or simply hand the page over. Cloning a page enables interactive discussions to take place. In this case, the doctor hands the page to the patient. While the patient is reviewing the image, the doctor reviews other data and views different pages in the report. The patient gives the page back to the doctor. As the doctor inserts the page at the wrong location, the flexible extension indicates an error. By bending the flexible extension, the page is "re-inserted" at the original location. If the flexible extension is pressed, the location is over-written and the page is inserted at this new location. Another way to re-insert the page into its original location may be to "clear" the page before inserting (e.g., via a shake gesture or using the flexible extension). A cleared page may be inserted anywhere. If it is inserted, the current content shown in the book is continued on these new pages.

Spreading out Pages: The user might, for example, remove three pages from the book. The pages left in the mobile system are used to take notes. In this two dimensional setup, IR components (receive/RX and/or transmit/TX) on each corner or along the page edge enables the pages to determine their relative position to each other (bearing, not distance). This approach may enable content to be moved and/or aligned by an application running on each page in order to effectively extend the size of the display.

3D CAD: The user wants to draw. One page is the "drawing canvas", another page north of the drawing page is a "reference image" to be drawn from (e.g. the screen is slightly tilted up) and the page right to the drawing canvas is the "tool and color pallet". In the reference image, the user zooms in and draws an outline around a 3D object using an ePen. A long static-press-and-hold allows to select the outline. With a swipe south, the sketch imports into the drawing canvas. In the drawing canvas, the user centers the sketch. The user selects a "3D toolbox" on the page right (tool and color pallet). The user then sets the perspective and sketches the relative length of the edges, adds more objects, etc., and colors the image switching to a color pallet. Once the drawing is completed, the page with the generated data and state is inserted into the right location in the book. The option of file navigation also exists.

Paint: The page is capacitive and pressure sensitive. Using an eBrush, the user can mix colors on the tool and color pallet. The digital page captures strokes of individual hairs of the brush as well the pressure and the paint type for active color mixing and overlay on the canvas. This additional data may provide a realistic reproduction of the painting. Once completed, the painting can be inserted into the drawing folder. At a later point, the user might want to modify the image or, for example, make cut-outs. Using again page alignments, the user may clone the image, zoom into the various areas and use an electronic blade (eBlade) and electronic ruler (eRuler) to make precise cuts. Once the cut is made, the removed content may be moved to third page or reinserted on the cleared page.

Infinite Page Turn: A cylindrical spine allows a page to be moved all around the spine. The closest resemblance of this movement is how people read a newspaper, wherein the user reads the cover, opens up the page and reads on two pages. Here, the user would move the page all the way back and "re-open" the page to get a two page view. For a single page view, the user continues to flip the pages around. This approach effectively mimics an infinite page turn experience.

Additional Notes and Examples

Example 1 may include an interactive mobile system comprising an electronic spine; and a flexible digital page removably attached to the electronic spine, wherein the flexible digital page includes a first side with a first flexible display and a second side with a second flexible display.

Example 2 may include the mobile system of Example 1, further including a magnetic interface, wherein the flexible digital page is removably attached to the electronic spine via the magnetic interface.

Example 3 may include the mobile system of Example 2, wherein the magnetic interface includes a first plurality of magnetic elements longitudinally positioned adjacent to an external surface of the electronic spine; and a second plurality of magnetic elements longitudinally positioned adjacent to a shoulderband of the flexible digital page, wherein the first plurality of magnetic elements align with the second plurality of magnetic elements.

Example 4 may include the mobile system of Example 1, wherein the electronic spine includes a substantially smooth exterior surface and a shoulderband of the flexible digital page is slidable around a perimeter of the electronic spine.

Example 5 may include the mobile system of Example 4, wherein the electronic spine further includes a fluid; and a metallic agent floating in the fluid.

Example 6 may include the mobile system of Example 4, wherein the electronic spine further includes a metallic inlay formed around the perimeter of the electronic spine.

Example 7 may include the mobile system of Example 4, wherein the electronic spine further includes a metallic insert positioned adjacent to the perimeter of the electronic spine.

Example 8 may include the mobile system of Example 1, wherein the electronic spine includes surfaces defining one or more sockets and a shoulderband of the flexible digital page is positioned within one of the one or more sockets.

Example 9 may include the mobile system of Example 8, wherein the electronic spine includes surfaces defining a plurality of sockets, wherein the mobile system further includes a plurality of digital pages, and wherein the plurality of digital pages have a digital page count that is less than or equal to a socket count of the plurality of sockets.

Example 10 may include the mobile system of Example 8, wherein the flexible digital page includes an elastic headband positioned between the shoulderband and a region of the flexible digital page that includes the first display and the second display.

Example 11 may include the mobile system of Example 1, wherein an outer profile of the electronic spine is substantially formed in one of a cylinder shape, a half cylinder shape or a rectangular prism shape.

Example 12 may include the mobile system of Example 1, further including a wireless communication interface, wherein the electronic spine and the flexible digital page are to exchange data via the wireless communication interface.

Example 13 may include the mobile system of Example 12, wherein the wireless communication interface includes one or more of a capacitive coupling component, an electromagnetic coupling component, an optical coupling component, an infrared coupling component or a short-range wireless component.

Example 14 may include the mobile system of Example 12, wherein the data is to be exchanged bi-directionally.

Example 15 may include the mobile system of Example 12, wherein the data is to include user-generated data transferred from the flexible digital page to the electronic spine and the user-generated data indicates one or more of a bookmark, a handwritten note or a highlight.

Example 16 may include the mobile system of Example 1, further including a content controller to detect an event with respect to the flexible digital page and modify content presented on one or more of the first display or the second display in response to the event.

Example 17 may include the mobile system of Example 16, wherein the event includes one or more of a movement of the flexible digital page or user-generated data and the content controller is to interpret the event as one or more of a page flip, a data retrieval request or a data transmission request.

Example 18 may include the mobile system of Example 16, wherein the content controller is positioned within the electronic spine.

Example 19 may include the mobile system of Example 16, wherein the content controller is positioned within a shoulderband of the flexible digital page.

Example 20 may include the mobile system of Example 16, wherein the content controller is implemented in one or more of a host processor, a graphics accelerator, a memory or an operating system.

Example 21 may include the mobile system of Example 1, further including one or more rigid covers attached to the electronic spine.

Example 22 may include the mobile system of Example 21, wherein the one or more rigid covers include an active cover including a rigid display, wherein the flexible digital page is to present a keyboard.

Example 23 may include the mobile system of Example 21, further including a passive cover, wherein the passive cover includes a customizable exterior surface.

Example 24 may include the mobile system of Example 23, wherein the customizable exterior surface includes one or more of fabric, leather, canvas or acrylic.

Example 25 may include the mobile system of Example 1, wherein the one or more digital pages includes a plurality of digital pages coupled to the electronic spine, and wherein each of the plurality of digital pages is to present a different page of media content.

Example 26 may include the mobile system of Example 1, wherein the first flexible display includes a first textured touch surface and the second flexible display includes a second textured touch surface.

Example 27 may include the mobile system of Example 26, wherein the first textured touch surface is to capture input while the first flexible display is deactivated and the second textured touch surface is to capture input while the second flexible display is deactivated.

Example 28 may include the mobile system of Example 1, further including a first array of strain gauges coupled to a first touch surface of the first flexible display, wherein the first array of strain gauges is to quantify contact between the first flexible display and a writing implement; and a second array of strain gauges coupled to a second touch surface of the second flexible display, wherein the second array of strain gauges is to quantify contact between the second flexible display and the writing implement.

Example 29 may include the mobile system of any one of Examples 1 to 28, wherein the flexible digital page further includes a display portion containing the first flexible display and the second flexible display, the display portion including an inner edge and an outer edge, a shoulderband coupled to the electronic spine and the inner edge of the display portion; and a flexible extension coupled to the outer edge of the display portion.

Example 30 may include the mobile system of Example 29, further including one or more light emitting diodes (LEDs) positioned within the flexible extension, wherein the one or more LEDs are to generate notifications.

Example 31 may include the mobile system of Example 30, further including one or more photodetectors positioned within the flexible extension, wherein the one or more LEDs are to further transmit outbound data and the one or more photodetectors are to receive inbound data.

Example 32 may include the mobile system of Example 31, wherein the inbound data and the outbound data are to indicate one or more of media content, a bookmark to the media content, a handwritten note on the media content or a highlight of the media content.

Example 33 may include the mobile system of Example 30, wherein the one or more LEDs includes a plurality of LEDs longitudinally positioned along the flexible extension.

Example 34 may include the mobile system of Example 33, wherein two or more of the plurality of LEDs are to output a different color of light.

Example 35 may include the mobile system of Example 34, wherein different colors of light are to indicate different bookmarks to media content.

Example 36 may include the mobile system of Example 29, wherein the flexible extension includes a textured exterior surface.

Example 37 may include the mobile system of Example 29, wherein an outer profile of the flexible extension is substantially formed in a triangular prism shape.

Example 38 may include the mobile system of Example 29, wherein the flexible extension includes an edge monitor to detect three-dimensional (3D) user input and send the 3D user input to a content controller.

Example 39 may include the mobile system of Example 38, further including one or more sensors coupled to the edge monitor and a housing of the flexible extension, wherein the one or more sensors include one or more of a strain gauge or a piezoelectric transducer.

Example 40 may include the mobile system of Example 38, wherein the 3D user input is to include one or more of a squeeze of the flexible extension, a pull of the flexible extension, a flick of the flexible extension, a drag of the flexible extension or a bend of the flexible extension.

Example 41 may include the mobile system of Example 29, wherein the flexible extension includes a haptic feedback element.

Example 42 may include the mobile system of Example 29, wherein the shoulderband includes a non-volatile memory to store page data associated with media content, a first light sensor positioned on the first side of the flexible digital page, the first light sensor to generate a first illumination measurement signal, a second light sensor positioned on the second side of the flexible digital page, the second light sensor to generate a second illumination measurement signal, a motion sensor to generate a motion measurement signal, a host processor to execute an operating system, a graphics accelerator to format the media content; and a display driver to send, in conjunction with the operating system, the formatted media content to one or more of the first flexible display or the second flexible display based on one or more of the first illumination measurement signal, the second illumination measurement signal or the motion measurement signal.

Example 43 may include the mobile system of Example 42, wherein the display driver is to deactivate the first flexible display when the first illumination measurement signal indicates that the first flexible display is not being viewed, and deactivate the second flexible display when the second illumination measurement signal indicates that the second flexible display is not being viewed.

Example 44 may include the mobile system of any one of Examples 1 to 28, further including one or more inductive power transmitters positioned within the electronic spine, and one or more inductive power receivers positioned within a shoulderband of the flexible digital page.

Example 45 may include the mobile system of Example 44, wherein the one or more inductive power transmitters include a plurality of inductive power transmitters longitudinally positioned adjacent to an external surface of the electronic spine, wherein the one or more inductive power receivers include a plurality of inductive power receivers longitudinally positioned adjacent to the shoulderband of the flexible digital page, and wherein the plurality of inductive power transmitters magnetically align with the plurality of inductive power receivers.

Example 46 may include the mobile system of Example 44, wherein the electronic spine includes a rechargeable battery, a spine interface manager, a direct current (DC) to alternating current (AC) converter coupled to the rechargeable battery and the spine interface manager, and wherein the one or more inductive power transmitters include a separable transformer core and one or more windings coupled to the DC to AC converter.

Example 47 may include the mobile system of Example 44, wherein the one or more inductive power receivers include a separable transformer core and one or more windings, and wherein the shoulderband includes a page interface manager, an alternating current (AC) to direct current (DC) converter coupled to the one or more windings and the page interface manager; and a charge storage component coupled to the AC to DC converter, the charge storage component to power the flexible digital page.

Example 48 may include the mobile system of Example 44, further including a connection controller to determine whether the flexible digital page is attached to the electronic spine.

Example 49 may include the mobile system of Example 48, wherein the connection controller includes one or more of a Hall sensor or a Reed switch.

Example 50 may include the mobile system of Example 44, wherein the electronic spine and the flexible digital page are to exchange data via the one or more inductive power transmitters and the one or more inductive power receivers.

Example 51 may include the mobile system of any one of Examples 1 to 28, further including a first camera coupled to the electronic spine, a second camera coupled to the first flexible display; and a third camera coupled to the second flexible display.

Example 52 may include the mobile system of Example 51, wherein the electronic spine is to determine a position of the flexible digital page based on signals from one or more of the first camera, the second camera or the third camera.

Example 53 may include an interactive mobile system comprising an electronic subsystem including one or more displays and an outer edge, a flexible extension coupled to the outer edge of the electronic subsystem; and one or more light emitting diodes (LEDs) positioned within the flexible extension.

Example 54 may include the mobile system of Example 53, wherein the one or more LEDs are to generate notifications.

Example 55 may include the mobile system of Example 54, further including one or more photodetectors positioned within the flexible extension, wherein the one or more LEDs are to further transmit outbound data and the one or more photodetectors are to receive inbound data.

Example 56 may include the mobile system of Example 55, wherein the inbound data and the outbound data are to indicate one or more of media content, a bookmark to the media content, a handwritten note on the media content or a highlight of the media content.

Example 57 may include the mobile system of Example 53, wherein the one or more LEDs includes a plurality of LEDs longitudinally positioned along the flexible extension.

Example 58 may include the mobile system of Example 57, wherein two or more of the plurality of LEDs are to output a different color of light.

Example 59 may include the mobile system of Example 58, wherein different colors of light are to indicate different bookmarks to media content.

Example 60 may include the mobile system of Example 53, wherein the flexible extension includes a textured exterior surface.

Example 61 may include the mobile system of Example 53, wherein an outer profile of the flexible extension is substantially formed in a triangular prism shape.

Example 62 may include the mobile system of Example 53, wherein the flexible extension includes an edge monitor to detect three-dimensional (3D) user input and send the 3D user input to a content controller.

Example 63 may include the mobile system of Example 62, further including one or more sensors coupled to the edge monitor and a housing of the flexible extension, wherein the one or more sensors include one or more of a strain gauge or a piezoelectric transducer.

Example 64 may include the mobile system of Example 62, wherein the 3D user input is to include one or more of a squeeze of the flexible extension, a pull of the flexible extension, a flick of the flexible extension, a drag of the flexible extension or a bend of the flexible extension.

Example 65 may include the mobile system of Example 53, wherein the flexible extension includes a haptic feedback element.

Example 66 may include the mobile system of any one of Examples 53 to 65, further including one or more inductive power transmitters positioned within a first component of the electronic subsystem, and one or more inductive power receivers positioned within a second component of the electronic subsystem.

Example 67 may include the mobile system of Example 66, further including a plurality of inductive power transmitters longitudinally positioned adjacent to an external surface of the first component; and a plurality of inductive power receivers longitudinally positioned adjacent to an external surface of the second component, wherein the plurality of inductive power transmitters align with the plurality of inductive power receivers.

Example 68 may include the mobile system of Example 66, wherein the first component includes a rechargeable battery, a first interface manager, a direct current (DC) to alternating current (AC) converter coupled to the rechargeable battery and the first interface manager, and wherein the one or more inductive power transmitters include a separable transformer core and one or more windings coupled to the DC to AC converter.

Example 69 may include the mobile system of Example 66, wherein the one or more inductive power receivers include a separable transformer core and one or more windings, and wherein the second component includes a second interface manager, an alternating current (AC) to direct current (DC) converter coupled to the one or more windings and the second interface manager; and a charge storage component coupled to the AC to DC converter, the charge storage component to power the second component.

Example 70 may include the mobile system of Example 66, further including a connection controller to determine whether the second component is attached to the first component.

Example 71 may include the mobile system of Example 70, wherein the connection controller includes one or more of a Hall sensor or a Reed switch.

Example 72 may include the mobile system of Example 66, wherein the first component and the second component are to exchange data via the one or more inductive power transmitters and the one or more inductive power receivers.

Example 73 may include an interactive mobile system comprising one or more inductive power transmitters positioned within a first component; and one or more inductive power receivers positioned within a second component, wherein the one or more inductive power transmitters magnetically align with the one or more inductive power receivers.

Example 74 may include the mobile system of Example 73, wherein the one or more inductive power transmitters include a plurality of inductive power transmitters longitudinally positioned adjacent to an external surface of the first component, wherein the one or more inductive power receivers include a plurality of inductive power receivers longitudinally positioned adjacent to the shoulderband of the second component, and wherein the plurality of inductive power transmitters magnetically align with the plurality of inductive power receivers.

Example 75 may include the mobile system of Example 73, wherein the first component includes a rechargeable battery, a first interface manager, a direct current (DC) to alternating current (AC) converter coupled to the rechargeable battery and the first interface manager, and wherein the one or more inductive power transmitters include a separable transformer core and one or more windings coupled to the DC to AC converter.

Example 76 may include the mobile device of Example 73, wherein the one or more inductive power receivers include a separable transformer core and one or more windings, and wherein the second component includes a second interface manager, an alternating current (AC) to direct current (DC) converter coupled to the one or more windings and the second interface manager; and a charge storage component coupled to the AC to DC converter, the charge storage component to power the second component.

Example 77 may include the mobile device of Example 73, further including a connection controller to determine whether the second component is attached to the first component.

Example 78 may include the mobile device of Example 77, wherein the connection controller includes one or more of a Hall sensor or a Reed switch.

Example 79 may include the mobile device of Example 73, wherein the first component and the second component are to exchange data via the one or more inductive power transmitters and the one or more inductive power receivers.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An interactive mobile system comprising:
   an electronic spine;

a flexible digital page removably attached to the electronic spine, wherein the flexible digital page includes a first side with a first flexible display and a second side with a second flexible display; and a magnetic interface, wherein the flexible digital page is removably attached to the electronic spine via the magnetic interface, and wherein the magnetic interface includes:

a first plurality of magnetic elements longitudinally positioned adjacent to an external surface of the electronic spine; and a second plurality of magnetic elements longitudinally positioned adjacent to a shoulderband of the flexible digital page, wherein the first plurality of magnetic elements align with the second plurality of magnetic elements.

2. The mobile system of claim 1, wherein the electronic spine includes a substantially smooth exterior surface and a shoulderband of the flexible digital page is slidable around a perimeter of the electronic spine.

3. The mobile system of claim 2, wherein the electronic spine further includes:

a fluid; and a metallic agent floating in the fluid.

4. The mobile system of claim 2, wherein the electronic spine further includes a metallic inlay formed around the perimeter of the electronic spine.

5. The mobile system of claim 2, wherein the electronic spine further includes a metallic insert positioned adjacent to the perimeter of the electronic spine.

6. The mobile system of claim 1, wherein the electronic spine includes surfaces defining one or more sockets and a shoulderband of the flexible digital page is positioned within one of the one or more sockets.

7. The mobile system of claim 6, wherein the electronic spine includes surfaces defining a plurality of sockets, wherein the mobile system further includes a plurality of digital pages, and wherein the plurality of digital pages have a digital page count that is less than or equal to a socket count of the plurality of sockets.

8. The mobile system of claim 6, wherein the flexible digital page includes an elastic headband positioned between the shoulderband and a region of the flexible digital page that includes the first display and the second display.

9. The mobile system of claim 1, wherein an outer profile of the electronic spine is substantially formed in one of a cylinder shape, a half cylinder shape or a rectangular prism shape.

10. The mobile system of claim 1, further including a wireless communication interface, wherein the electronic spine and the flexible digital page are to exchange data via the wireless communication interface.

11. The mobile system of claim 10, wherein the wireless communication interface includes one or more of a capacitive coupling component, an electromagnetic coupling component, an optical coupling component, an infrared coupling component or a short-range wireless component.

12. The mobile system of claim 10, wherein the data is to be exchanged bi-directionally.

13. The mobile system of claim 10, wherein the data is to include user-generated data transferred from the flexible digital page to the electronic spine and the user-generated data indicates one or more of a bookmark, a handwritten note or a highlight.

14. The mobile system of claim 1, further including a content controller to detect an event with respect to the flexible digital page and modify content presented on one or more of the first display or the second display in response to the event.

15. The mobile system of claim 14, wherein the event includes one or more of a movement of the flexible digital page or user-generated data and the content controller is to interpret the event as one or more of a page flip, a data retrieval request or a data transmission request.

16. The mobile system of claim 14, wherein the content controller is positioned within the electronic spine.

17. The mobile system of claim 14, wherein the content controller is positioned within a shoulderband of the flexible digital page.

18. The mobile system of claim 14, wherein the content controller is implemented in one or more of a host processor, a graphics accelerator, a memory or an operating system.

19. The mobile system of claim 1, further including one or more rigid covers attached to the electronic spine.

20. The mobile system of claim 19, wherein the one or more rigid covers include an active cover including a rigid display, wherein the flexible digital page is to present a keyboard.

21. The mobile system of claim 19, further including a passive cover, wherein the passive cover includes a customizable exterior surface.

22. The mobile system of claim 21, wherein the customizable exterior surface includes one or more of fabric, leather, canvas or acrylic.

23. The mobile system of claim 1, wherein the one or more digital pages includes a plurality of digital pages coupled to the electronic spine, and wherein each of the plurality of digital pages is to present a different page of media content.

24. The mobile system of claim 1, wherein the first flexible display includes a first textured touch surface and the second flexible display includes a second textured touch surface.

25. The mobile system of claim 24, wherein the first textured touch surface is to capture input while the first flexible display is deactivated and the second textured touch surface is to capture input while the second flexible display is deactivated.

26. The mobile system of claim 1, further including:

a first array of strain gauges coupled to a first touch surface of the first flexible display, wherein the first array of strain gauges is to quantify contact between the first flexible display and a writing implement; and a second array of strain gauges coupled to a second touch surface of the second flexible display, wherein the second array of strain gauges is to quantify contact between the second flexible display and the writing implement.

27. The mobile system of claim 1, further including:

a first camera coupled to the electronic spine;

a second camera coupled to the first flexible display; and a third camera coupled to the second flexible display.

28. The mobile system of claim 27, wherein the electronic spine is to determine a position of the flexible digital page based on signals from one or more of the first camera, the second camera or the third camera.

* * * * *